US012610297B2

(12) United States Patent
Murugaiyan et al.

(10) Patent No.: US 12,610,297 B2
(45) Date of Patent: Apr. 21, 2026

(54) METHOD AND USER EQUIPMENT SUPPORTING MUSIM FOR PRIORITIZING CELLS

(71) Applicant: Samsung Electronics Co., Ltd., Suwon-si (KR)

(72) Inventors: Vivek Murugaiyan, Bangalore (IN); Amit Anandrao Dange, Bangalore (IN); Kailash Kumar Jha, Bangalore (IN); Anoop Perumudi Veedu, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 276 days.

(21) Appl. No.: 18/333,128

(22) Filed: Jun. 12, 2023

(65) Prior Publication Data

US 2024/0056923 A1     Feb. 15, 2024

Related U.S. Application Data

(63) Continuation of application No. PCT/KR2023/006069, filed on May 3, 2023.

(30) Foreign Application Priority Data

Aug. 12, 2022    (IN) .............................. 202241046151
Mar. 17, 2023    (IN) .............................. 202241046151

(51) Int. Cl.
*H04W 36/08*        (2009.01)
*H04W 36/00*        (2009.01)
(Continued)

(52) U.S. Cl.
CPC ....... *H04W 36/08* (2013.01); *H04W 36/0061* (2013.01); *H04W 36/0085* (2018.08);
(Continued)

(58) Field of Classification Search
CPC ............. H04W 36/08; H04W 36/0061; H04W 36/0085; H04W 36/362; H04W 76/27;
(Continued)

(56) References Cited

U.S. PATENT DOCUMENTS 11,974,356 B2     4/2024   Tseng et al.
2015/0350953 A1*  12/2015  Himayat ............... H04W 40/02
                                               370/235
(Continued)

FOREIGN PATENT DOCUMENTS

CN        113473547 A      10/2021
CN        114095983        2/2022
(Continued)

OTHER PUBLICATIONS

VIVO, "[Pre117-e][230][MUSIM] Summary Stage-3 details of Musim", 3GPP TSG-RAN WG2 Meeting #117e R2-2203635 E-Conference, Feb. 21-Mar. 3, 2022-03, 24 pages.
(Continued)

*Primary Examiner* — Chandrahas B Patel
*Assistant Examiner* — Kabir U Jahangir
(74) *Attorney, Agent, or Firm* — Nixon & Vanderhye, P.C.

(57)        ABSTRACT

An example method performed by a User Equipment (UE) supporting a Multi-Universal Subscriber Identity Module (MUSIM), the method comprises connecting a first SIM of the UE with a primary cell. The method comprises receiving a radio resource control (RRC) reconfiguration message of the primary cell including information on candidate cells for a conditional handover, a conditional Primary Secondary (PS) cell addition, or a conditional PS cell change. The method comprises identifying that a RRC reconfiguration message of each of the candidate cells comprises at least one of leave assistance information or gap assistance informa- (Continued)

tion. The method comprises performing prioritizing at least one candidate cell of the candidate cells that supports MUSIM assistance information, in response to identifying that the RRC reconfiguration message comprises at least one of the leave assistance information or the gap assistance information.

20 Claims, 28 Drawing Sheets

(51) Int. Cl.
    *H04W 36/36*     (2009.01)
    *H04W 76/27*     (2018.01)
    *H04W 88/06*     (2009.01)

(52) U.S. Cl.
    CPC ......... *H04W 36/362* (2023.05); *H04W 76/27* (2018.02); *H04W 88/06* (2013.01)

(58) Field of Classification Search
    CPC ... H04W 88/06; H04W 60/005; H04W 8/183; H04W 48/20
    See application file for complete search history.

(56)           References Cited

U.S. PATENT DOCUMENTS

| | | | |
|---|---|---|---|
| 2022/0225190 A1 | 7/2022 | Gummadi | |
| 2024/0196195 A1* | 6/2024 | Shrivastava | H04W 72/21 |
| 2024/0340928 A1* | 10/2024 | Kim | H04W 36/0088 |
| 2025/0031120 A1* | 1/2025 | Xiao | H04W 24/02 |
| 2025/0150941 A1* | 5/2025 | Yamamoto | H04W 48/08 |
| 2025/0254513 A1* | 8/2025 | Abraham | H04W 76/15 |

FOREIGN PATENT DOCUMENTS

| | | |
|---|---|---|
| WO | 2020247043 A1 | 12/2020 |
| WO | 2021/029819 A1 | 2/2021 |
| WO | 2022/130273 | 6/2022 |
| WO | 2022/151246 | 7/2022 |

OTHER PUBLICATIONS

3GPP TS 38.331 V18.1.0 (Mar. 2024) Technical Specification 3rd Generation Partnership Project; Technical Specification Group Radio Access Network; NR; Radio Resource Control (RRC) protocol specification (Release 18), 70 pages.

International Search Report dated Aug. 18, 2023 in PCT/KR2023/006069.
Written Opinion dated Aug. 18, 2023 in PCT/KR2023/006069.
3GPP TS 38.331 V17.4.0, 3rd Generation Partnership Project; Radio Resource Control (RRC) protocol specification, Mar. 2023, Technical Specification Group Radio Access Network, 1324 pages.
Extended Search Report dated Apr. 11, 2025 in European Application No. 23852679.2.
"3rd Generation Partnership Project; Technical Specification Group Radio Access Network; Evolved Universal Terrestrial Radis Access (E-UTRA) and Evolved Universal Terrestrial Radio Access Network (E-UTRAN), Overall description; Stage 2(Release: 17)",3GPP Standard; Technical Specification; 3GPP TS 36.300, 3rd Generation Partnership Project (3GPP), vol. RAN WG2, No. V17.1.0, Jul. 19, 2022 (Jul. 19, 2022), pp. 1-401, XF052183747, Retrieved from the Internet:URL:https://ftp.3gpp.org/Specs/archive/36_series/36.300/36300-h10.zip 36500-h10.docx.
"3rd Generation Partnership Project; Technical Specification Group Radio Access Network; NR; NR and NG-RAN Overall Description; Stage 2 (Release 17)", 3GPP Standard; Technical Specification; 3GPP TS 38.300, 3rd Generation Partnership Project (3GPP), vol. RAN WG2, No. V17.1.019 Jul. 2022 (Jul. 19, 2022), pp. 1-209, XP052183752, Retrieved from the Internet:URL:https://ftp.3gpp.org/Specs/archive/38_ series/38.300/38300-h10.zip 38300-h10.docx.
"3rd Generation Partnership Project; Technical Specification Group Radio Access Network; NR; Radio Resource Control (RRC) protocol specification (Release 17)", 3GPP Standard; Technical Specification; 3GPP TS 38.331, 3rd Generation Partnership Project (3GPP), vol. RAN WG2, No. V17.1.0 Jul. 19, 2022 (Jul. 19, 2022), pp. 1-1273, XP052183757, Retrieved from the Internet: URL:https://ftp.3gpp.org/Specs/archive/38_series/38.331/38331-h10.zip 38331-h10.docx.
Nokia et al: "Rel-17 CPAC related corrections to TS 38.331", 3GPP Draft; R2-2207320, 3rd Generation Partnership Project (3GPP), vol. RAN WG2, No. Electronic; Aug. 17, 2022-Aug. 26, 2022 Aug. 10, 2022 (Aug. 10, 2022), XP052260643, Retrieved from the Internet: URL:https://ftp.3gpp.org/tsg_ran/WG2_RL2/T SGR2_119-e/Docs/R2-2207320.zip R2-2207320 Rel-17 CPAC corrections to NR 38.331. docx, 20 pages.
VIVO: "[Pre117-e][230][MUSIM] Summary Stage-3 details of MUSIM",3GPP Draft; R2-2203635, 3rd Generation Partnership Project (3GPP), vol. RAN WG2, No. E-Conference; Feb. 21, 2022-Mar. 3, 2022 Feb. 21, 2022 (Feb. 21, 2022), XP052131494, Retrieved from the Internet: URL:https://ftp.3gpp.org/tsg_ran/WG2_RL2/TSGR2_117-e/Inbox/R2-2203635.zip R2-2203635 [Pre117-e][230][MUSIM] Summary Stage-3 details of MUSIM-v0.docx, 24 pages.

* cited by examiner

1500

METHOD AND USER EQUIPMENT SUPPORTING MUSIM FOR PRIORITIZING CELLS

CROSS-REFERENCE TO RELATED APPLICATIONS

This application is a continuation of International Application No. PCT/KR2023/006069, designating the United States, filed May 3, 2023, and which claims priority to Indian Provisional Application No. 202241046151, filed Aug. 12, 2022, in the Indian Patent Office and to Indian Complete Application No. 202241046151, filed on Mar. 17, 2023, in the Indian Patent Office. The contents of each of these applications are incorporated herein by reference in their entireties.

BACKGROUND

Field

The disclosure relates to wireless communication and, more specifically, to a method and a User Equipment (UE) supporting a Multi-Universal Subscriber Identity Module (MUSIM) for prioritizing cells.

Description of Related Art

A User Equipment (UE) supporting a Multi-Universal Subscriber Identity Module (MUSIM) is more popular nowadays in different countries, in which the MUSIM support allows a user to keep two subscriptions (e.g., SIMs) in the same UE for different services.

SUMMARY

Various example embodiments disclosed herein can provide a method and a UE supporting Multi-Universal Subscriber Identity Module (MUSIM) for prioritizing secondary cells. The various example embodiments can allow the UE to prioritize the secondary cells that include a MUSIM assistance configuration based on a musim-LeaveAssistanceConfig-r17 information element or a musim-GapAssistanceConfig-r17 information element received in an RRC reconfiguration of respective candidate secondary cells during a conditional handover or a conditional PS cell addition/change for a MUSIM device (i.e. UE). Thus, the various example embodiments can ensure the UE increases the chance to maintain connectivity between two networks, which enhances the user experience by ensuring the MUSIM device continues to get benefits of these features even after the conditional handover and the conditional PS cell addition/change is completed. The various example embodiments have high technical value as the MUSIM assistance configuration has been introduced in 3GPP Release-17 which defines the method for switching connectivity between two networks in the MUSIM device.

Various example embodiments can maintain service connectivity between two networks in the device and reduce the chance of radio link failure upon switching between dual SIM on the MUSIM device.

Various example embodiments provide a method for prioritizing cells by a User Equipment (UE) supporting Multi-Universal Subscriber Identity Module (MUSIM). The method may include connecting, by the UE, a first SIM of the UE with a primary cell; identifying, by the UE, candidate secondary cells for one of a conditional handover, a conditional Primary Secondary (PS) cell addition, or a conditional PS cell change; determining, by the UE, whether a Radio Resource Control (RRC) reconfiguration message of the candidate secondary cells comprises leave assistance information and/or gap assistance information; prioritizing, by the UE, one or more candidate secondary cells of the candidate secondary cells supporting MUSIM assistance information when the RRC reconfiguration message of the one or more candidate secondary cells includes the leave assistance information and/or the gap assistance information; and prioritizing, by the UE, the candidate secondary cells based on a signal strength of the candidate secondary cells, when the RRC reconfiguration message of the one or more candidate secondary cells does not include the leave assistance information and/or the gap assistance information.

In an embodiment, the connecting, by the UE, the first SIM with the primary cell may include activating, by the UE, a Dedicated Data Service (DDS) in the first SIM; connecting, by the UE, the first SIM with the primary cell; registering, by the UE, on the primary cell; and enabling, by the UE, an idle mode on a second SIM of the UE.

In an embodiment, the identifying, by the UE, of the candidate secondary cells for one of the conditional handover, the conditional PS cell addition, or the conditional PS cell change may include receiving, by the UE, the RRC reconfiguration message including a list of secondary cells from the primary cell; and identifying, by the UE, the candidate secondary cells for one of the conditional handover, the conditional PS cell addition, or the conditional PS cell change from the list of secondary cells.

In an embodiment, the determining, by the UE, of whether the RRC reconfiguration message of the candidate secondary cells includes the leave assistance information and/or the gap assistance information may include performing, by the UE, a measurement of the candidate secondary cells for the conditional handover; detecting, by the UE, that multiple candidate secondary cells are suitable for the conditional handover based on the measurement; and determining, by the UE, whether the RRC reconfiguration message of the multiple candidate secondary cells includes the leave assistance information and/or the gap assistance information for the conditional handover.

In an embodiment, the determining, by the UE, of whether the RRC reconfiguration message of the candidate secondary cells includes the leave assistance information and/or the gap assistance information may include performing, by the UE, a measurement of the candidate secondary cells for the conditional PS cell addition; determining, by the UE, that multiple candidate secondary cells are suitable for the conditional PS cell addition based on the measurement; and determining, by the UE, whether the RRC reconfiguration message of the multiple candidate secondary cells includes the leave assistance information and/or the gap assistance information for the conditional PS cell addition.

In an embodiment, the determining, by the UE, of whether the RRC reconfiguration message of the candidate secondary cells includes the leave assistance information and/or the gap assistance information may include performing, by the UE, a measurement of the candidate secondary cells for the conditional PS cell change; determining, by the UE, that multiple candidate secondary cells are suitable for the conditional PS cell change based on the measurement; and determining, by the UE, whether the RRC reconfiguration message of the multiple candidate secondary cells includes the leave assistance information and/or the gap assistance information for the conditional PS cell change.

In an embodiment, the prioritizing, by the UE, of the one or more candidate secondary cells supporting MUSIM assistance information may include detecting, by the UE, a first candidate secondary cell with MUSIM assistance information support, and a second candidate secondary cell without MUSIM assistance information support based on availability of the leave assistance information and/or the gap assistance information in the RRC reconfiguration message; determining, by the UE, that a signal strength of the second candidate secondary cell is greater than a signal strength of the first candidate secondary cell; determining, by the UE, a second value associated with the signal strength of the second candidate secondary cell based on a lowest signal strength reported in a network; determining, by the UE, a first value associated with the signal strength of the first candidate secondary cell based on the lowest signal strength reported in the network and a weight for the signal strength of the first candidate secondary cell; and prioritizing, by the UE, the first candidate secondary cell and the second candidate secondary cells based on the first value and the second value.

In an embodiment, the prioritizing, by the UE, of the one or more candidate secondary cells supporting MUSIM assistance information may include identifying, by the UE, two or more candidate secondary cells with the MUSIM assistance information support; and prioritizing, by the UE, the two or more candidate secondary cells based on a signal strength, a bandwidth, and a High-Power User Equipment (HPUE) support.

The various example embodiments herein may provide a UE supporting MUSIM for prioritizing the cells. The UE may include a secondary cell prioritizing engine, a memory, and a processor, wherein the secondary cell prioritizing engine is coupled to the memory and the processor. The secondary cell prioritizing engine may be configured for connecting the first SIM of the UE with a primary cell; identifying the candidate secondary cells for conditional handover, or conditional PS cell addition, or conditional PS cell change; determining whether the RRC reconfiguration message of the candidate secondary cells includes the leave assistance information and/or the gap assistance information; prioritizing the one or more candidate secondary cells of the candidate secondary cells supporting the MUSIM assistance information when the RRC reconfiguration message of the one or more candidate secondary cells includes the leave assistance information and/or the gap assistance information; and prioritizing the candidate secondary cells based on the signal strength of the candidate secondary cells, when the RRC reconfiguration message of the one or more candidate secondary cells does not include the leave assistance information and/or the gap assistance information.

According to embodiments, a method performed by a User Equipment (UE) supporting a Multi-Universal Subscriber Identity Module (MUSIM), the method comprises connecting a first SIM of the UE with a primary cell. The method comprises receiving a radio resource control (RRC) reconfiguration message of the primary cell including information on candidate cells for a conditional handover, a conditional Primary Secondary (PS) cell addition, or a conditional PS cell change. The method comprises identifying that a RRC reconfiguration message of each of the candidate cells comprises at least one of leave assistance information or gap assistance information. The method comprises performing prioritizing at least one candidate cell of the candidate cells that supports MUSIM assistance information, in response to identifying that the RRC reconfiguration message comprises at least one of the leave assistance information or the gap assistance information.

According to embodiments, a User Equipment (UE) supporting a Multi-Universal Subscriber Identity Module (MUSIM), the UE comprises a processor. The UE comprises a transceiver. The processor is configured to connect a first SIM of the UE with a primary cell. The processor is configured to receive a radio resource control (RRC) reconfiguration message of the primary cell including information on candidate cells for a conditional handover, a conditional Primary Secondary (PS) cell addition, or a conditional PS cell change. The processor is configured to identify that a RRC reconfiguration message of each of the candidate cells comprises at least one of leave assistance information or gap assistance information. The processor is configured to perform prioritizing at least one candidate cell of the candidate cells that supports MUSIM assistance information, in response to identifying that the RRC reconfiguration message of the at least one candidate cell comprises at least one of the leave assistance information or the gap assistance information.

According to embodiments, a non-transitory computer-readable storage medium having stored thereon program instructions, the instructions, when executed by a processor of a User Equipment (UE) supporting a Multi-Universal Subscriber Identity Module (MUSIM), perform operations including connecting a first SIM of the UE with a primary cell. The instructions, when executed by the processor, perform operations including receiving a radio resource control (RRC) reconfiguration message of the primary cell including information on candidate cells for a conditional handover, a conditional Primary Secondary (PS) cell addition, or a conditional PS cell change. The instructions, when executed by the processor, perform operations including identifying that a RRC reconfiguration message of each of the candidate cells comprises at least one of leave assistance information or gap assistance information. The instructions, when executed by the processor, performing operations including perform prioritizing at least one candidate cell of the candidate cells that supports MUSIM assistance information, in response to identifying that the RRC reconfiguration message comprises at least one of the leave assistance information or the gap assistance information.

These and other aspects of the embodiments herein will be better appreciated and understood when considered in conjunction with the following description and the accompanying drawings. It should be understood, however, that the following descriptions, while indicating example embodiments and numerous specific details thereof, are given by way of illustration and not by way of limitation. Many changes and modifications may be made within the scope of the embodiments, and the embodiments herein include all such modifications.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as various embodiments can be combined with one or more other embodiments to form other embodiments. The term "or" as used herein refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may, for example, be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Figure 1A:
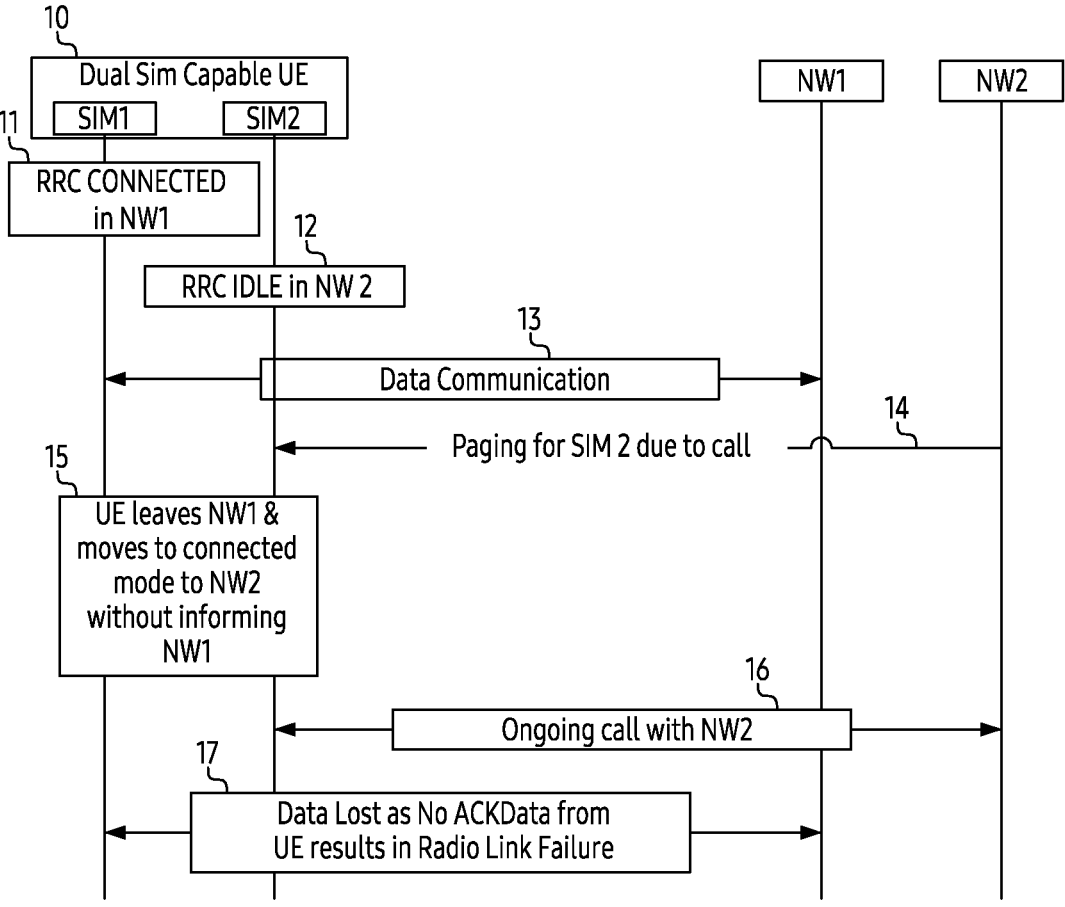
FIG. 1A is a sequence diagram illustrating switching of subscriptions in a UE without a MUSIM assistance configuration according to related art.

FIG. 1A is a sequence diagram illustrating the switching of the subscriptions in the UE (10) without a MUSIM assistance configuration, according to related art. Generally, the UE (10) stays in an RRC_CONNECTED state (11) in a serving cell (NW1) (primary cell) corresponding to a first SIM (SIM1) of the UE (10) for data communication (13) and remains in an IDLE state (12) in a target cell (NW2) (secondary cell) corresponding to a second SIM (SIM2) of the UE (10). Upon receiving any paging request for answering an incoming call (14) from the target cell (NW2), the UE (10) switches (15) the RRC_CONNECTED state from the serving cell (NW1) to the target cell (NW2), and receives the call (16) without notifying the serving cell (NW1) to either leave the RRC_CONNECTED state or be kept in the RRC_CONNECTED state in the serving cell (NW1). As a result, a radio link failure occurs between the UE (10) and the serving cell (NW1), which further leads to data loss.

To maintain connectivity with the serving cell (NW1), the UE (10) should notify the serving cell (NW1) to either leave the RRC_CONNECTED state or be kept in the RRC_CONNECTED state in the serving cell (NW1) while temporarily switching to the target cell (NW2). The MUSIM support in the UE (10) and switching between two subscriptions in the UE (10) is currently handled in an implementation-specific manner without any support from 3$^{rd}$ Generation Partnership Project (3GPP) specifications, resulting in a variety of implementations and UE (10) behaviours. Standardizing the MUSIM support for such UE (10)'s can prove beneficial from a performance perspective as network functionality can be based on predictable UE (10) behaviour.

Figure 1B:
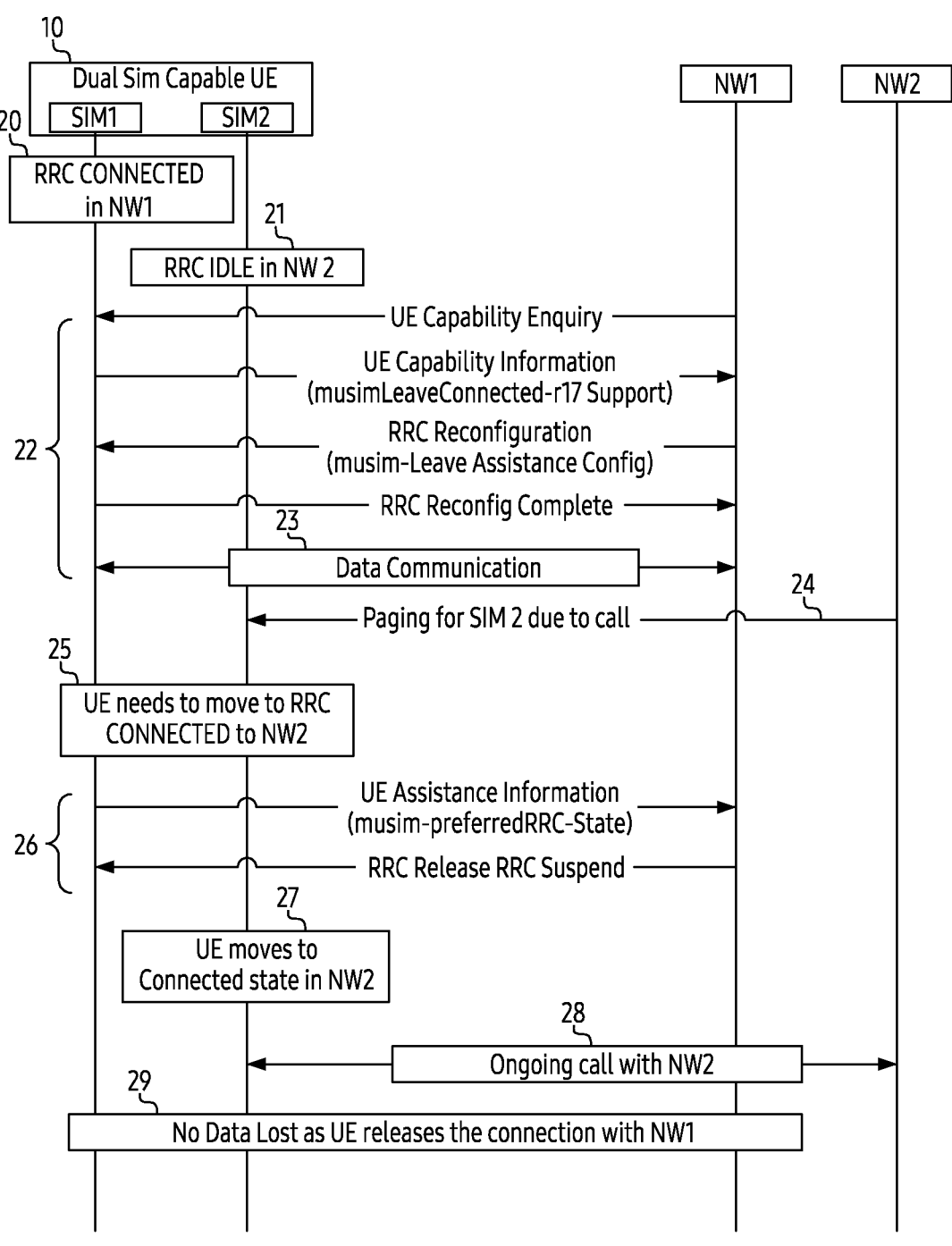
FIG. 1B and FIG. 1C are sequence diagrams illustrating switching of subscriptions in a UE with a MUSIM assistance configuration according to related art.
Figure 1C:
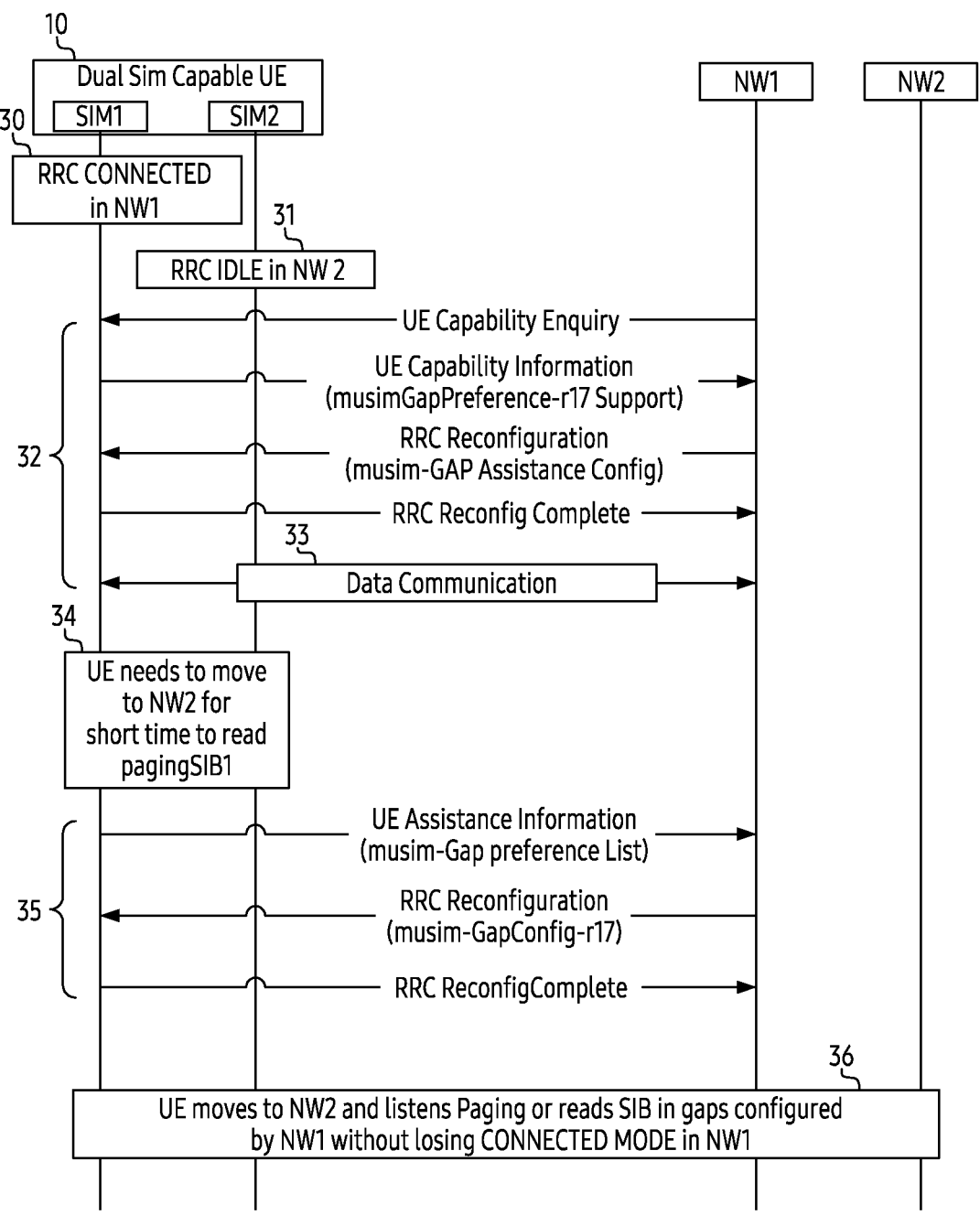

To maintain service continuity in the UE (10) with the MUSIM support, a MUSIM assistance configuration is defined to be included in an RRC reconfiguration message as per a Release 17 NR of the 3GPP specifications. FIG. 1B and FIG. 1C are sequence diagrams illustrating the switching of the subscriptions in the UE (10) with the MUSIM assistance configuration, according to related art. The UE (10) stays in the RRC_CONNECTED state (20, 30) in the serving cell (NW1) (i.e. serving network) corresponding to the first SIM (SIM1) of the UE (10) for the data communication (23, 33) and remains in the IDLE state (21, 31) in the target cell (NW2) corresponding to the second SIM (SIM2) of the UE (10). Further, the UE (10) obtains MUSIM assistance configuration from the serving cell (NW1) in otherconfig-r17 Information Element (IE) in the RRC reconfiguration message of Release 17 which includes Musim-GapAssistanceConfig-r17 (32) and Musim-LeaveAssistanceConfig-r17 (22). The UE (10) can indicate whether it supports MUSIM leave connected (22) or MUSIM Gap preference (32) in UE capability information to the serving cell (NW1) which helps the serving cell (NW1) to identify the supported UE (10) and include in the RRC reconfiguration message.

The Musim-LeaveAssistanceConfig-r17 contains a configuration for the UE (10) to report the MUSIM assistance information when leaving the RRC_CONNECTED state from the serving cell (NW1). When the UE (10) wishes to leave (34) the RRC_CONNECTED state, then the UE (10) indicates its preference state (RRC_IDLE or RRC_INACTIVE) to change in the serving cell (NW1). The Musim-GapAssistanceConfig-r17 contains a configuration for the UE (10) to report the MUSIM assistance information without leaving the RRC_CONNECTED state from the serving cell (NW1). The UE (10) includes the preferred gap configuration when the UE (10) stays in the RRC_CONNECTED state while leaving the serving cell (NW1) temporarily and switching to the target cell (NW2).

The UE (10) sends MUSIM assistance information (26, 35) in the UE assistance information message when the UE (10) needs to switch from the serving cell (NW1) to the target cell (NW2) (e.g., switching between two SIM's). The serving cell (NW1) configures the UE (10) with the gap configuration through the RRC reconfiguration message when the UE (10) prefers to stay in the RRC_CONNECTED state in response to receiving the MUSIM assistance information in a UE assistance information message from the UE (10). The UE (10) releases or suspends (27-29, 36) the connection when the UE (10) needs to leave the RRC_CONNECTED state in the serving cell (NW1) based on the preferred state in the MUSIM assistance information indicated by the UE (10). This mechanism helps the UE (10) to inform the serving cell (NW1) about its switching to another network (NW2) so that the serving cell (NW1) knows the UE state and avoids radio link failure and lost data, and helps to maintain connectivity of the two networks with the UE (10).

Figure 2A:
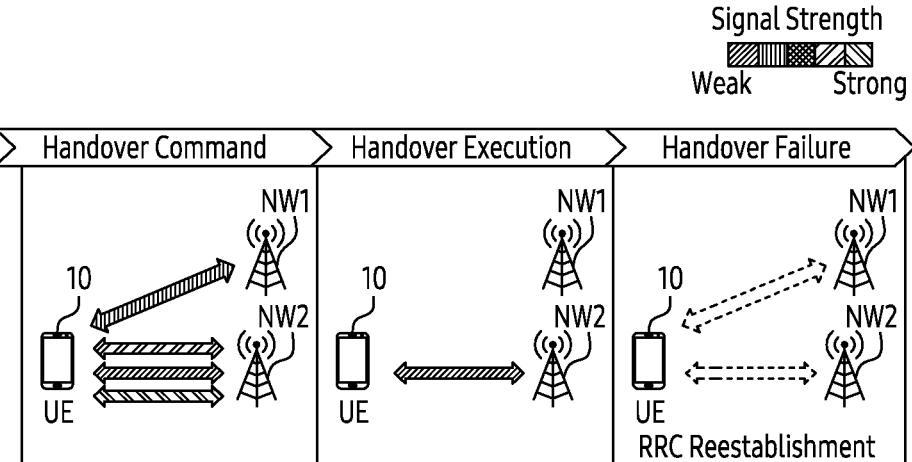
FIG. 2A illustrates an example scenario of a failure in handover in mobile communication according to related art.

FIG. 2A illustrates an example scenario of a failure in handover in mobile communication according to related art. The UE (10) transmits a measurement report to the serving cell (NW1) based on a measurement report configuration in the UE (10). The network evaluates the UE (10) conditions based on the measurement report and moves the connection of the UE (10) to the target cell (NW2) from the serving cell (NW1) by sending target cell information to the UE (10) in handover. The UE (10) is provided with the information of only one target cell (NW2) for handover. Since a radio link degradation and a fluctuation in signal strength can occur during handover due to UE (10) mobility on the target cell (NW2) in the handover, the measurement report may never reach the network or the RRC reconfiguration for the handover may fail to reach the UE (10) which leads to failure of the UE (10) to maintain the RRC_CONNECTED state and interruption of data connection at the UE (10). Conditional Handover (CHO) is introduced in Release 16 in which the UE (10) is provided with multiple target cell information to perform handover to increase the robustness in the handover process and reduce the data interruption time.

Figure 2B:
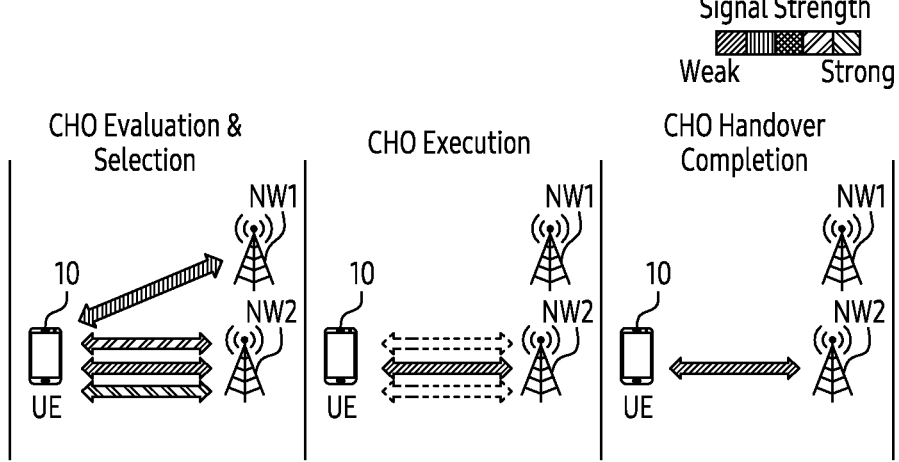
FIG. 2B illustrates an example scenario of a conditional handover in mobile communication according to related art.

FIG. 2B illustrates an example scenario of the conditional handover in mobile communication according to related art. The network configures the UE (10) with one or more candidate target SPCells in the conditional reconfiguration that contains the information to perform handover for the respective candidate cells along with evaluation conditions to be monitored similar to the measurement information. The UE (10) evaluates the condition of each configured candidate target SPCell and applies the conditional configuration associated with one of the target SPCells which fulfils the condition and through which handover gets a success. Thus, the chances of the handover failure get reduced to increase the robustness of the process as the UE (10) configures with multiple target information and chooses the target SPCell to perform handover based on evaluation condition.

Figure 2C:
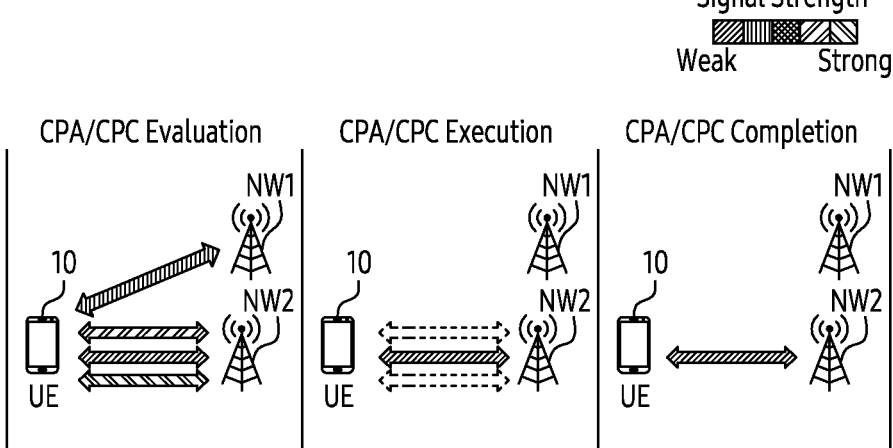
FIG. 2C illustrates an example scenario of a conditional PS cell change/addition in mobile communication according to related.

FIG. 2C illustrates an example scenario of a Conditional PS cell Change (CPC) or a Conditional PS cell Addition (CPA) in mobile communication according to related art. Similar to the conditional handover, the conditional PS cell change has been introduced in Release 16 and the conditional PS cell addition has been introduced in Release 17. The network configures the UE (10) with the candidate target SPCells in the conditional reconfiguration along with the evaluation condition which contains the information to perform the secondary PS cell addition and the secondary PS cell change. The UE (10) monitors the candidate cells and evaluates the condition of each configured candidate target SPCells and applies the conditional configurations associated with one of the target SPCells which fulfils the associated execution condition and performs conditional PS cell addition/change.

During the conditional handover and the conditional PSCell addition/change, the serving cell (NW1) configures the UE (10) with the multiple candidate target cells in a conditional reconfiguration along with the evaluation condition. Further, the UE (10) performs the conditional handover or the conditional PSCell addition/change with the candidate target cell that satisfies the evaluation criteria configured and moves to the target cell (NW2) that satisfies the condition.

Currently, the UE (10) selects and moves to the target cell (NW2) based on signal strength such as RSRP, RSRQ, SINR, etc. upon multiple candidate cells satisfying the evaluation condition configured in reconfiguration during the conditional handover without considering the MUSIM assistance configuration. Similarly, during the conditional PSCell addition/change, the UE (10) performs the measurement of the candidate cells received in a secondary cell group configuration. Further, the UE (10) adds/changes the SCG with the candidate target cell (NW2) that satisfies the conditions configured in the conditional reconfiguration. Further, the UE (10) selects/changes the secondary PSCell based on the signal strength upon multiple candidate cells satisfying the condition configured in reconfiguration during the conditional PSCell addition/change. So the UE (10) does not consider Leave Assistance configuration IE or Gap Assistance configuration IE present in the RRC reconfiguration of the candidate cells while selecting from the multiple candidate cells during the conditional handover or the conditional PSCell addition/change. Since the UE (10) does not consider the MUSIM assistance configuration during the conditional handover or the conditional PSCell addition/change, the UE (10) is neglecting the chance to perform handover or SCG addition/change with the cell supporting the MUSIM assistance configuration and choose other cells. The UE (10) does not prioritize the cells based on the MUSIM assistance configuration which can lead the UE (10) to be in the cells causing radio link failure during switching connectivity between the networks. Also, such behaviour causes the UE (10) to discard the chance of maintaining service continuity and increases the chance of data loss and radio link failure in the UE (10). Thus, it would be desirable to provide a useful alternative for controlling SMS communication in a wireless communication network.

Throughout this disclosure, the terms "source cell", "primary cell" and "serving cell" may be used interchangeably and can refer to the same thing. Throughout this disclosure, the terms "cell" and "gNB" may be used interchangeably and can refer to the same thing. Throughout this disclosure, the terms "signal parameter" "signal strength", and "signal condition" may be used interchangeably and can mean the same thing. Throughout this disclosure, the terms "target cell", "secondary cell" "candidate secondary cell" and "candidate cell" may be used interchangeably and can mean the same thing.

Switching connectivity between two SIMs in a MUSIM device (e.g., UE) is crucial as the MUSIM device should not lose connectivity in any of the SIMs. During a conditional handover, or a conditional PSCell addition/change, the UE may move to a secondary cell based on signal parameters such as Reference Signal Received Power (RSRP)/Reference Signal Received Quality (RSRQ)/Signal to Interference Noise Ratio (SINR) upon satisfying a condition configured in a conditional reconfiguration of the multiple candidate cells without considering MUSIM assistance configuration, even for MUSIM device. A MUSIM assistance information feature has been introduced by 3GPP in NR in Release-17. This feature helps a UE to report the MUSIM assistance information to a network when the UE moves to another network (switching SIMs) and thus maintains connectivity in both networks in the MUSIM device (e.g., UE).

According to related methods and systems, the UE may select a secondary cell which does not configure release-17 MUSIM assistance information during a conditional handover, or a conditional PSCell addition/change. This can lead to a chance for radio link failure when maintaining connectivity between two networks in a MUSIM device which could have been avoided if the UE would have moved to the secondary cell configured with the release-17 MUSIM assistance information. There is no defined prioritization yet to move the UE to the MUSIM assistance-supported cell. Unlike related methods and systems, the example embodiments can ensure that the UE moves to a secondary cell that includes the MUSIM assistance configuration in the MUSIM device whenever possible.

The example embodiments can ensure the UE prioritizes the secondary cells that include the MUSIM assistance configuration based on a musim-LeaveAssistanceConfig-r17 information element or a musim-GapAssistanceConfigr17 information element received in the RRC reconfiguration of the respective candidate cell during the conditional handover, or the conditional PSCell addition/change for the MUSIM device. Thus, the example embodiments can ensure the UE increases the chance to maintain connectivity between two networks, which enhances the user experience by ensuring the MUSIM device continues getting benefits of these features even after the conditional handover and the conditional PS cell addition/change is completed. The example embodiments can have high technical value as the MUSIM assistance configuration has been introduced in 3GPP Release-17 which defines the method to switch connectivity between two networks in the MUSIM device.

For a conditional handover, the UE will perform measurement for the candidate cells configured in conditional reconfiguration and the UE will perform handover with the candidate cells that satisfy the condition configured in reconfiguration. In the example embodiments, the UE can check for the musim-LeaveAssistanceConfig-r17 or the musim-GapAssistanceConfig-r17 in the RRC reconfiguration of the candidate cells that satisfy the conditional handover condition and prioritize the candidate cell configured with the MUSIM assistance configuration and attempt to perform the handover to that particular cell.

For the conditional PS cell addition/change, the UE performs the measurement for the candidate cells configured in conditional reconfiguration of the PS cell addition/change and the UE will perform the secondary PS cell addition/modification with the candidate cells that satisfy the condition configured in reconfiguration. In the example embodiments, the UE can check for the musim-LeaveAssistanceConfig-r17 Information Element (IE) or the musim-GapAssistanceConfig-r17 Information Element (IE) in the RRC reconfiguration of the candidate cells that satisfy the secondary PS cell addition/change and prioritize the candidate cell configured with the MUSIM assistance configuration and attempt to perform secondary PS cell addition/change to that particular cell.

Accordingly, the example embodiments herein provide a method for prioritizing cells by the User Equipment (UE) supporting the MUSIM. The method may include connecting, by the UE, a first SIM of the UE with a primary cell; identifying, by the UE, candidate secondary cells for one of the conditional handover, the conditional Primary Secondary (PS) cell addition, and the conditional PS cell change; determining, by the UE, whether a Radio Resource Control (RRC) reconfiguration message of the candidate secondary cells includes leave assistance information and/or gap assistance information; prioritizing, by the UE, one or more candidate secondary cells of the candidate secondary cells supporting MUSIM assistance information when the RRC reconfiguration message of the one or more candidate secondary cells include the leave assistance information and the gap assistance information; and prioritizing, by the UE, the candidate secondary cells based on a signal strength of the candidate secondary cells, when the RRC reconfiguration message of the one or more candidate secondary cells does not include the leave assistance information and the gap assistance information.

Accordingly, the example embodiments herein provide a UE supporting MUSIM for prioritizing the cells. The UE may include a secondary cell prioritizing engine, a memory, and a processor, wherein the secondary cell prioritizing engine is coupled to the memory and the processor. The secondary cell prioritizing engine is configured to connect the first SIM of the UE with a primary cell; identify candidate secondary cells for a conditional handover, or a conditional PS cell addition, or a conditional PS cell change; determine whether an RRC reconfiguration message of the candidate secondary cells includes leave assistance information or/and gap assistance information; prioritize the one or more candidate secondary cells of the candidate secondary cells supporting MUSIM assistance information when the RRC reconfiguration message of the one or more candidate secondary cells includes the leave assistance information and/or the gap assistance information; and prioritize the candidate secondary cells based on signal strength of the candidate secondary cells, when the RRC reconfiguration message of the one or more candidate secondary cells does not include the leave assistance information and/or the gap assistance information.

Unlike related art methods and systems, the example embodiments can ensure that the UE selects the MUSIM assistance configuration supported NR cells for a MUSIM device during the conditional handover or the conditional secondary PScell addition/change. The example embodiments can ensure switching connectivity between two networks is smooth in the MUSIM device, avoid radio link failure, enrich end-user experience in mobile service continuity between two SIMs in the MUSIM device, improve mobility performance, and reduce the chance for radio link failure upon switching between dual SIMs on the UE.

Referring now to the drawings, and more particularly to FIGS. 3 through 14, example embodiments are shown.

Figure 3:
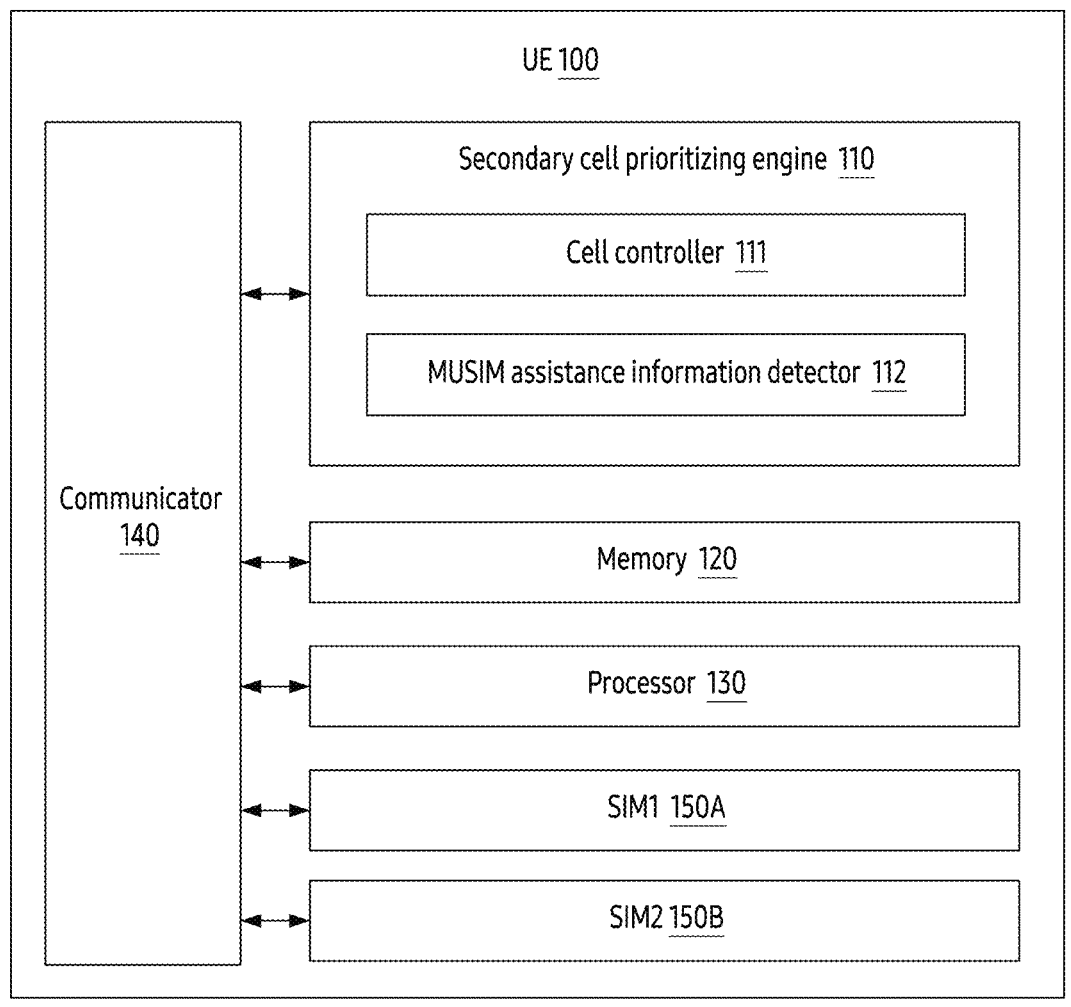
FIG. 3 is a block diagram of an example UE supporting MUSIM for prioritizing cells according to various embodiments.

FIG. 3 is a block diagram of an example UE (100) supporting MUSIM for prioritizing cells according to various embodiments. Examples of the UE (100) include, but are not limited to a smartphone, a tablet computer, a Personal Digital Assistance (PDA), a desktop computer, an Internet of Things (IoT) device, a wearable device, and the like. In an embodiment, the UE (100) includes a secondary cell prioritizing engine (110), a memory (120), a processor (130), a communicator (140), and at least two SIMs (i.e. SIM1 (150A), SIM2 (150B)). The secondary cell prioritizing engine (110) may, for example, be implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like. In an embodiment, the secondary cell prioritizing engine (110) includes a cell controller (111), and a MUSIM assistance information detector (112).

The secondary cell prioritizing engine (110) is configured for connecting the first SIM (150A) with a primary cell. In an embodiment, for connecting the first SIM (150A) with the primary cell, the secondary cell prioritizing engine (110) is configured for activating a Dedicated Data Service (DDS) in the first SIM (150A). Further, the secondary cell prioritizing engine (110) is configured for connecting the first SIM (150A) with the primary cell. Further, the secondary cell prioritizing engine (110) is configured for registering on the primary cell. Further, the secondary cell prioritizing engine (110) is configured for enabling an idle mode on the second SIM (150B).

The secondary cell prioritizing engine (110) is configured for identifying candidate secondary cells for one of a conditional handover, a conditional Primary Secondary (PS) cell addition, and a conditional PS cell change. In an embodiment, for identifying the candidate secondary cells for one of the conditional handover, the conditional PS cell addition, and the conditional PS cell change, the secondary cell prioritizing engine (110) is configured for receiving the RRC reconfiguration message including a list of secondary cells from the primary cell. Further, the secondary cell prioritizing engine (110) is configured for identifying the candidate secondary cells for one of the conditional handover, the conditional PS cell addition, and the conditional PS cell change from the list of secondary cells.

The secondary cell prioritizing engine (110) is configured for determining whether a Radio Resource Control (RRC) reconfiguration message of the candidate secondary cells includes leave assistance information and/or gap assistance information. For example, the secondary cell prioritizing engine (110) is configured to receive the RRC reconfiguration message of each of the candidate secondary cells. In an embodiment, for determining whether the RRC reconfiguration message of the candidate secondary cells includes the leave assistance information and/or the gap assistance information, the secondary cell prioritizing engine (110) is configured for performing a measurement of the candidate secondary cells for the conditional handover. Further, the secondary cell prioritizing engine (110) is configured for detecting that multiple candidate secondary cells are suitable for the conditional handover based on the measurement. Further, the secondary cell prioritizing engine (110) is configured for determining whether the RRC reconfiguration message of the multiple candidate secondary cells includes the leave assistance information and/or the gap assistance information for the conditional handover. Here, the at least one of the gap assistance information includes a configuration for the UE (100) to report assistance information without leaving RRC_CONNECTED for the MUSIM purpose and the leave assistance information includes a configuration for the UE (100) to report assistance information for leaving RRC_CONNECTED for the MUSIM purpose. The gap assistance information and the leave assistance information help the UE (100) to report assistance information to the network when the UE (100) moves to another network and thus maintain connectivity between two networks in the Multi-USIM device.

In an embodiment, for determining whether the RRC reconfiguration message of the candidate secondary cells includes the leave assistance information and/or the gap assistance information, the secondary cell prioritizing engine (110) is configured for performing the measurement of the candidate secondary cells for the conditional PS cell addition. Further, the secondary cell prioritizing engine (110) is configured for determining that multiple candidate secondary cells are suitable for the conditional PS cell addition based on the measurement. Further, the secondary cell prioritizing engine (110) is configured for determining whether the RRC reconfiguration message of the multiple candidate secondary cells includes the leave assistance information and/or the gap assistance information for the conditional PS cell addition.

In an embodiment, for determining whether the RRC reconfiguration message of the candidate secondary cells includes the leave assistance information and/or the gap assistance information, the secondary cell prioritizing engine (110) is configured for performing the measurement of the candidate secondary cells for the conditional PS cell change. Further, the secondary cell prioritizing engine (110) is configured for determining that multiple candidate secondary cells are suitable for the conditional PS cell change based on the measurement. Further, the secondary cell prioritizing engine (110) is configured for determining whether the RRC reconfiguration message of the multiple candidate secondary cells includes the leave assistance information and/or the gap assistance information for the conditional PS cell change.

The secondary cell prioritizing engine (110) is configured for prioritizing one or more candidate secondary cells of the candidate secondary cells supporting the MUSIM assistance information when the RRC reconfiguration message of the one or more candidate secondary cells includes the leave assistance information and/or the gap assistance information.

In an embodiment, for prioritizing the one or more candidate secondary cells supporting the MUSIM assistance information, the secondary cell prioritizing engine (110) is configured for detecting a first candidate secondary cell with MUSIM assistance information support, and a second candidate secondary cell without the MUSIM assistance information support based on the availability of the leave assistance information and/or the gap assistance information in the RRC reconfiguration message. Further, the secondary cell prioritizing engine (110) is configured for determining that a signal strength of the second candidate secondary cell is greater than a signal strength of the first candidate secondary cell. Further, the secondary cell prioritizing engine (110) is configured for determining a second value (e.g. converted RSRP) associated with the signal strength of the second candidate secondary cell based on a lowest signal strength reported in a network. Further, the secondary cell prioritizing engine (110) is configured for determining a first value (e.g. converted RSRP) associated with the signal strength of the first candidate secondary cell based on the lowest signal strength reported in the network and a weight for the signal strength of the first candidate secondary cell. Further, the secondary cell prioritizing engine (110) is configured for prioritizing the first candidate secondary cell and the second candidate secondary cells based on the first value and the second value.

In an embodiment, for prioritizing the one or more candidate secondary cells supporting the MUSIM assistance information, the secondary cell prioritizing engine (110) is configured for identifying two or more candidate secondary cells with the MUSIM assistance information support. Further, the secondary cell prioritizing engine (110) is configured for prioritizing the two or more candidate secondary cells based on a signal strength, a bandwidth, and a High-Power User Equipment (HPUE) support of the two or more secondary cells.

The secondary cell prioritizing engine (110) is configured for prioritizing the candidate secondary cells based on a signal strength of the candidate secondary cells, when the RRC reconfiguration message of the one or more candidate secondary cells does not include the leave assistance information and/or the gap assistance information.

The cell controller (111) connects the first SIM (150A) with the primary cell. In an embodiment, for connecting the first SIM (150A) with the primary cell, the cell controller (111) activates the DDS in the first SIM (150A). Further, the cell controller (111) connects the first SIM (150A) with the primary cell. Further, the cell controller (111) registers on the primary cell. Further, the cell controller (111) enables the idle mode on the second SIM (150B).

The cell controller (111) identifies the candidate secondary cells for one of the conditional handover, the conditional Primary Secondary (PS) cell addition, and the conditional PS cell change. In an embodiment, for identifying the candidate secondary cells for one of the conditional handover, the conditional PS cell addition, and the conditional PS cell change, the cell controller (111) receives the RRC reconfiguration message including a list of secondary cells from the primary cell. Further, the cell controller (111) identifies the candidate secondary cells for one of the conditional handover, the conditional PS cell addition, and the conditional PS cell change from the list of secondary cells.

The MUSIM assistance information detector (112) determines whether the RRC reconfiguration message of the candidate secondary cells includes the leave assistance information and/or the gap assistance information. For example, the RRC reconfiguration message is transmitted from each of the candidate secondary cells. In an embodiment, for determining whether the RRC reconfiguration message of the candidate secondary cells includes the leave assistance information and/or the gap assistance information, the MUSIM assistance information detector (112) performs the measurement of the candidate secondary cells for the conditional handover. Further, the MUSIM assistance information detector (112) detects that multiple candidate secondary cells are suitable for the conditional handover based on the measurement. Further, the MUSIM assistance information detector (112) determines whether the RRC reconfiguration message of the multiple candidate secondary cells includes the leave assistance information and/or the gap assistance information for the conditional handover.

In an embodiment, for determining whether the RRC reconfiguration message of the candidate secondary cells includes the leave assistance information and/or the gap assistance information, the MUSIM assistance information detector (112) performs the measurement of the candidate secondary cells for the conditional PS cell addition. Further, the MUSIM assistance information detector (112) determines that multiple candidate secondary cells are suitable for the conditional PS cell addition based on the measurement. Further, the MUSIM assistance information detector (112) determines whether the RRC reconfiguration message of the multiple candidate secondary cells includes the leave assistance information and/or the gap assistance information for the conditional PS cell addition.

In an embodiment, for determining whether the RRC reconfiguration message of the candidate secondary cells includes the leave assistance information and/or the gap assistance information, the MUSIM assistance information detector (112) performs the measurement of the candidate secondary cells for the conditional PS cell change. Further, the MUSIM assistance information detector (112) determines that multiple candidate secondary cells are suitable for the conditional PS cell change based on the measurement. Further, the MUSIM assistance information detector (112) determines whether the RRC reconfiguration message of the multiple candidate secondary cells includes the leave assistance information and/or the gap assistance information for the conditional PS cell change.

The cell controller (111) prioritizes the one or more candidate secondary cells of the candidate secondary cells supporting the MUSIM assistance information when the RRC reconfiguration message of the one or more candidate secondary cells includes the leave assistance information and/or the gap assistance information.

In an embodiment, for prioritizing the one or more candidate secondary cells supporting the MUSIM assistance information, the cell controller (111) detects the first candidate secondary cell with the MUSIM assistance information support, and the second candidate secondary cell without the MUSIM assistance information support based on availability of the leave assistance information and/or the gap assistance information in the RRC reconfiguration message.

Further, the cell controller (111) determines that the signal strength of the second candidate secondary cell is greater than the signal strength of the first candidate secondary cell. Further, the cell controller (111) determines the second value associated with the signal strength of the second candidate secondary cell based on the lowest signal strength reported in the network. Further, the cell controller (111) determines the first value associated with the signal strength of the first candidate secondary cell based on the lowest signal strength reported in the network and the weight for the signal strength of the first candidate secondary cell. Further, the cell controller (111) prioritizes the first candidate secondary cell and the second candidate secondary cells based on the first value and the second value.

In an embodiment, for prioritizing the one or more candidate secondary cells supporting the MUSIM assistance information, the cell controller (111) identifies the two or more candidate secondary cells with the MUSIM assistance information support. Further, the cell controller (111) prioritizes the two or more candidate secondary cells based on the signal strength, the bandwidth, and the HPUE support of the two or more secondary cells.

The cell controller (111) prioritizes the candidate secondary cells based on the signal strength of the candidate secondary cells, when the RRC reconfiguration message of the one or more candidate secondary cells does not include the leave assistance information and/or the gap assistance information.

In an embodiment, when two cells satisfy the evaluation criteria during the CHO/CPA/CPC in which one cell contains the MUSIM assistance configuration and other cell does not contain the MUSIM assistance configuration in the UE (100), then the UE (100) determines a delta value to compare between the MUSIM assistance configured cells and other cells with better signal strength value without MUSIM the assistance. The delta value can help to equalize the weight between the MUSIM assistance support and the signal strength conditions in cell prioritization. The solution is formulated on criteria that the RSRP of the cell that contains the MUSIM assistance configuration gives 15% additional weight in the RSRP calculation than the cell that does not contain the MUSIM assistance configuration as given, for example, in the below formula.

$$\text{Cell to prioritize in the UE} = \text{Maximum}((\text{RSRP of gNB1} - (-156) + \text{Delta Value}), (\text{RSRP of gNB2} - (-156)))$$

where, Delta Value=0.15*(RSRP of gNB1−(−156)), gNB1 is the cell with MUSIM assistance configuration, and gNB2 is the cell without MUSIM assistance configuration. Note: The value −156 is taken to convert RSRP to a positive value as it is the lowest RSRP value reported in NR.

Based on this calculated formula, the delta value will be high during the good signal condition (e.g., signal strength) and the delta value will be low during poor signal conditions. In both examples, the difference in the RSRP value between two cells is 10 dB, but the UE (100) chooses the cell with the MUSIM assistance in good signal condition and the cell with better signal in poor signal condition based on the calculated formula. With this approach, the MUSIM assistance configured cell will get more weight during good signal conditions and signal strength will get more weight during poor signal conditions, which ensures a balance between MUSIM assistance configuration and signal strength values.

Consider an example scenario given in table 1. In this example scenario, the UE (100) prefers the gNB2 for the CHO/CPA/CPC execution which is the cell without MUSIM Assistance configuration based on converted RSRP comparison.

TABLE 1

| Cell | MUSIM Assistance Config | RSRP | Converted RSRP |
|------|-------------------------|------|----------------|
| gNB1 | Included | −100 | Second value = (−100 − (−156)) + 0.1 (−100 − (−156)) = 64 |
| gNB2 | Not Included | −90 | First value = (−90 − (−156)) = 66 |

Consider an example scenario given in table 2. In this example scenario, the UE (100) prefers gNB1 which is the cell with MUSIM assistance configuration for the CHO/CPA/CPC execution based on the converted RSRP comparison.

TABLE 2

| Cell | MUSIM Assistance Config | RSRP | Converted RSRP |
|------|-------------------------|------|----------------|
| gNB1 | Included | −70 | Second value = (−70 − (−156)) + 0.1 (−70 − (−156)) = 99 |
| gNB2 | Not Included | −60 | First value = (−60 − (−156)) = 96 |

In an embodiment, if multiple neighbor cells support the MUSIM assistance information, then the UE (100) prioritizes the cells based on other cell parameters including, for example, the signal strength, the bandwidth, and the HPUE support. The UE (100) determines the signal strength, for example, by measuring the RSRP power value of the cell. The UE (100) determines the bandwidth, for example, from a System information Block 1 (SIB1). The UE (100) determines the HPUE support, for example, from SIB2/SIB4 of the cell. This method ensures that the UE (100) selects the best (or most) suitable cell even among multiple MUSIM assistance-supported cells during the CHO/CPA/CPC execution.

Consider an example scenario given in table 3 in which candidate cells support the MUSIM assistance information and the MUSIM assistance information is included in its conditional reconfiguration. So the UE (100) checks for other parameters and finds that the gNB4 has better signal strength and bandwidth and also supports the HPUE, and hence chooses the gNB4 for the CHO.

TABLE 3

| Candidate cells | MUSIM Support | Signal Level | Bandwidth | HPUE Support |
|-----------------|---------------|--------------|-----------|--------------|
| gNB1 | Supported | −90 db | 15 MHz | Not Supported |
| gNB2 | Supported | −95 dB | 10 MHz | Supported |
| gNB3 | Supported | −85 dB | 20 MHz | Not Supported |
| gNB4 | Supported | −85 db | 20 MHz | Supported |

The memory (120) stores a list of candidate secondary cells. The memory (120) stores instructions to be executed by the processor (130). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted to mean that the memory (120) is non-movable. In various examples, the memory (120) can be configured to store larger amounts of information than its storage space. In various examples, a non-transitory storage medium may store data that can, over time, change (e.g., in Random Access Memory (RAM) or cache). The memory (120) can be an internal storage unit or it can be an external storage unit of the UE (100), a cloud storage, or any other type of external storage.

The processor (130) (including, e.g., processing circuitry) is configured to execute instructions stored in the memory (120). The processor (130) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130) may include multiple cores to execute the instructions. The communicator (140) (including, e.g., communication circuitry) is configured for communicating internally between hardware components in the UE (100). Further, the communicator (140) is configured to facilitate communication between the UE (100) and other devices via one or more networks (e.g. radio technology). The communicator (140) includes an electronic circuit specific to a standard that enables wired or wireless communication.

Although FIG. 3 shows certain hardware components of the UE (100), it is to be understood that other embodiments are not limited in this respect. For example, the UE (100) may include less or a greater number of components. Further, the labels or names of the components are used only for illustrative purpose and do not limit the scope of the disclosure. One or more components can be combined together to perform same or substantially similar function for prioritizing the cells.

Figure 4:
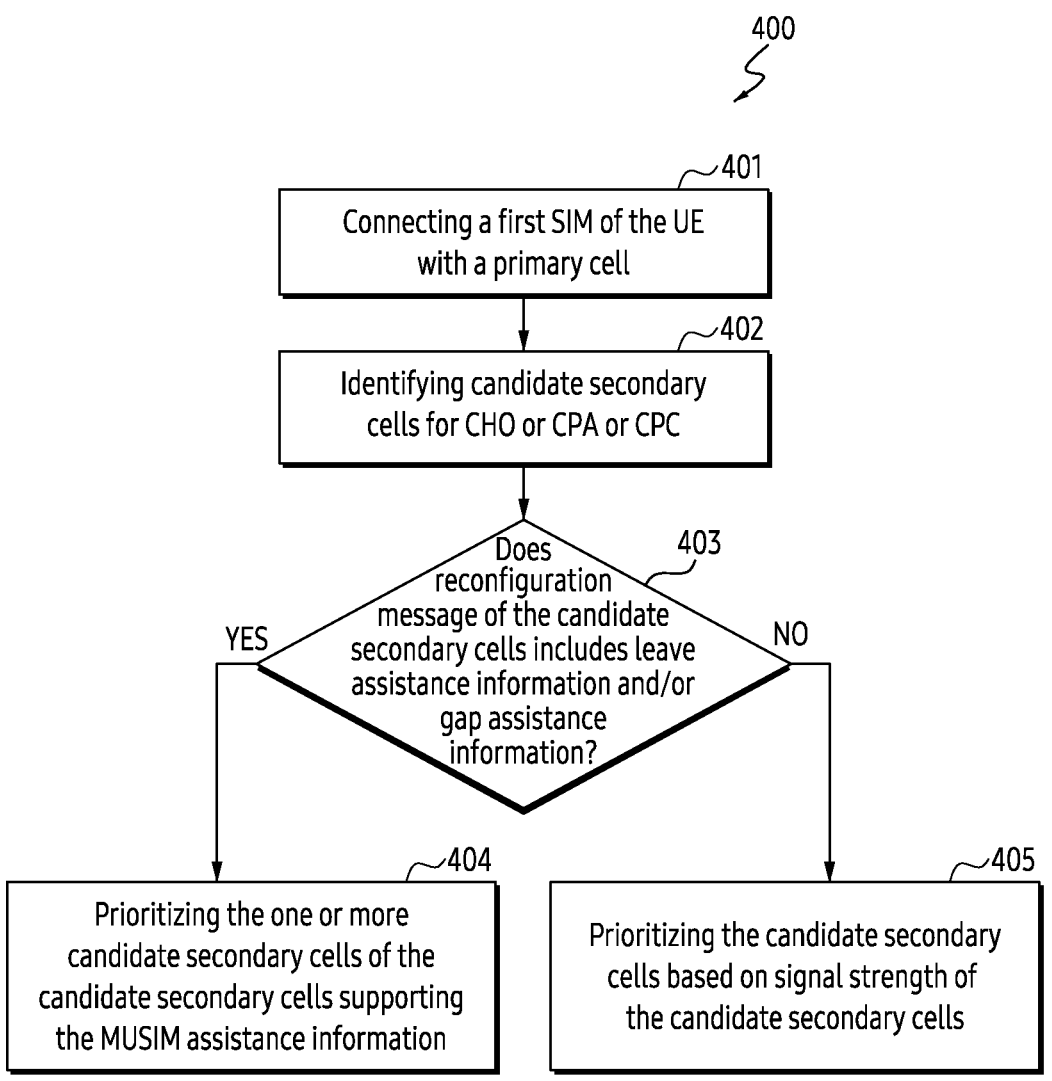
FIG. 4 is a flow diagram illustrating an example method for prioritizing cells according to various embodiments.

FIG. 4 is a flow diagram (400) illustrating an example method for prioritizing cells according to various embodiments. In an embodiment, the method allows the secondary cell prioritizing engine (110) to perform steps 401, 402, 403, 404, and 405 of the flow diagram (400). At step 401, the method includes connecting the first SIM (150A) of the UE (100) with a primary cell. At step 402, the method includes identifying candidate secondary cells for CHO or CPA or CPC. At step 403, the method includes determining whether a reconfiguration message of the candidate secondary cells includes leave assistance information and/or gap assistance information. At step 404, the method includes prioritizing the one or more candidate secondary cells of the candidate secondary cells supporting MUSIM assistance information when the RRC reconfiguration message of the one or more candidate secondary cells includes the leave assistance information and/or the gap assistance information. For example, the UE (100) may receive the RRC reconfiguration message of each of the one or more candidate secondary cells. At step 405, the method includes prioritizing the candidate secondary cells based on signal strength of the candidate secondary cells when the RRC reconfiguration message of the one or more candidate secondary cells does not include the leave assistance information and/or the gap assistance information.

The various actions, acts, blocks, steps, or the like in the flow diagram (400) may be performed in the order presented, in a different order, or simultaneously. Further, in various embodiments, some of the actions, acts, blocks, steps, or the like may be omitted, added, modified, skipped, or the like without departing from the scope of the disclosure.

Figure 5:
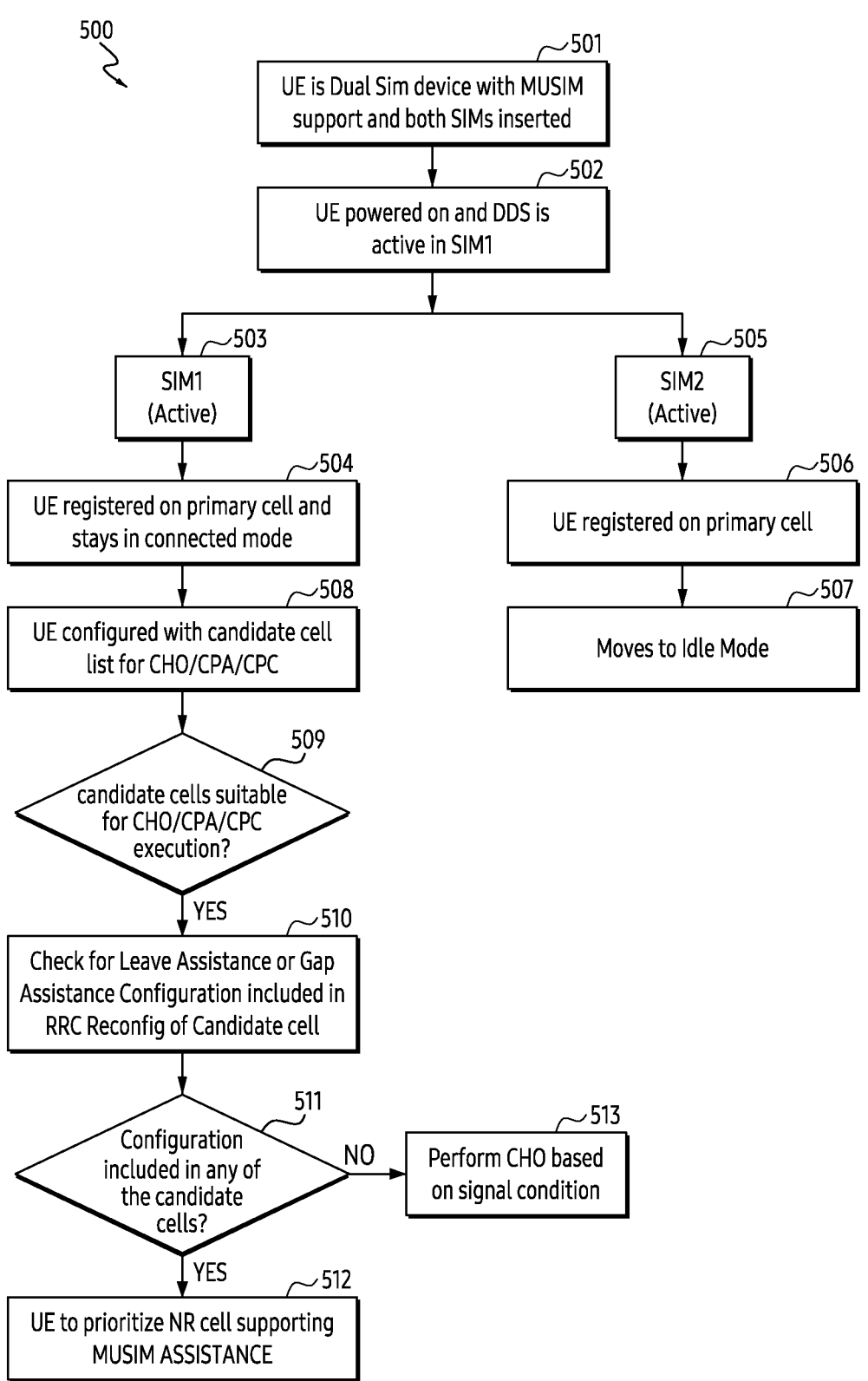
FIG. 5 is a flow diagram illustrating an example method for prioritizing secondary cells based on MUSIM assistance information according to various embodiments.

FIG. 5 is a flow diagram (500) illustrating an example method for prioritizing secondary cells based on MUSIM assistance information according to various embodiments. The MUSIM assistance feature introduced in release 17 deals with the feature of maintaining connectivity between two networks in the MUSIM device. The MUSIM assistance feature will not be useful when the UE (100) is a single SIM device or only one SIM is inserted in the MUSIM device as switching connectivity between two SIMs cannot happen. The MUSIM assistance feature will not serve its purpose even in a case in which one SIM is not registered to the network due to a subscription failure or the UE (100) does not support the MUSIM assistance feature. As the example embodiment may involve cell prioritization based on usage of the MUSIM assistance feature, conditions applicable to MUSIM assistance usage apply to the example method. The flow diagram (500) includes steps 501 to 513. At 501, the UE (100) is the dual SIM device that supports the MUSIM and both SIMs (150A, 150B) are inserted into the UE (100).

At 502, the UE (100) is powered on and a Dedicated Data Service (DDS) is active in the SIM1 (150A). At 503, 504, 505, and 506, both SIMs (150A, 150B) get attached to the network and registered on the primary cell in which the SIM1 (150A) is in the connected mode. At 507, the UE (100) enables the idle mode on the second SIM (150B). At 508, the UE (100) is configured with a candidate cell list for CHO/CPA/CPC. At 509, the UE (100) checks for candidate cells that are suitable for the CHO/CPA/CPC execution from the candidate cell list. At 510, upon identifying the candidate cells suitable for the CHO/CPA/CPC execution, the UE (100) checks for leave assistance configuration or gap assistance configuration included in the RRC reconfiguration of the identified candidate cell. At 511 and 512, the UE (100) prioritizes the candidate cell supporting MUSIM assistance for the CHO/CPA/CPC execution upon detecting the configuration in any of the candidate cells. At 511 and 513, the UE (100) performs the CHO/CPA/CPC execution based on signal condition upon not detecting the configuration in any of the candidate cells.

Figure 6A:
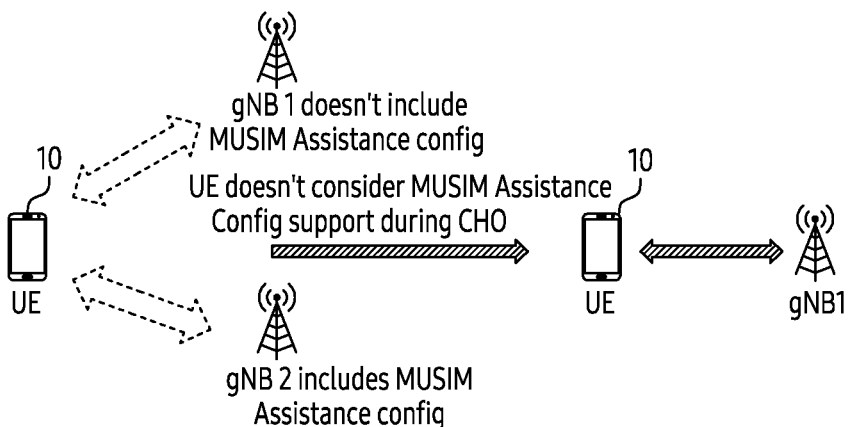
FIGS. 6A and 6B illustrate a comparison of example scenarios of prioritizing the secondary cells for a CHO according to an example embodiment and a related art method.
Figure 6B:
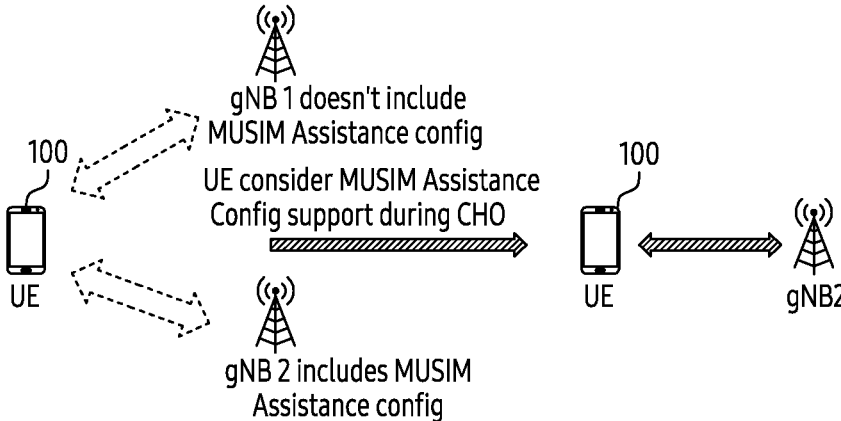

FIGS. 6A and 6B illustrate a comparison of example scenarios of prioritizing secondary cells for CHO according to an example embodiment and a related art method. Consider, the UE (10) is the MUSIM capable device and the RRC connected mode is enabled in the UE (10). The network has configured the UE (10) with a list of candidate cells for conditional handover. The UE (10) measures the candidate cells and evaluates the conditional reconfiguration of these cells. If any of the candidate neighbor cells satisfies the condition criteria, then the UE (10) executes the conditional handover to it. Currently, the UE (10) performs the conditional handover on the cell based on the signal strength irrespective of any feature support in the other candidate cells and no priority is considered when multiple cells satisfy the evaluation criteria.

Consider an example of prioritizing secondary cells for CHO according to the related art method as shown in the FIG. 6A. For example, consider the UE (10) is a MUSIM device and configured with multiple candidate cells for the conditional handover. During the evaluation, two candidate cells gNB1 and gNB2 satisfy the condition simultaneously.

The candidate cell gNB1 does not include Release-17 MUSIM assistance configuration and the candidate cell gNB2 includes Release-17 MUSIM assistance configuration in its conditional reconfiguration. In this scenario, the UE (10) executes the CHO to the candidate cell gNB1 without considering any kind of prioritization. Based on the signal strength, the UE (10) moves to the candidate cell gNB1 which does not include MUSIM assistance configuration. So the UE (10) moves to the cell that does not include the MUSIM assistance configuration. As a result, the UE (10) may not maintain connectivity in both networks in the MUSIM device though the UE (10) had the chance to obtain it.

As per an example embodiment, during the conditional handover when the network configures the list of candidate cells and multiple candidate cells satisfy the evaluation criteria, the UE (100) will prioritize the execution of the conditional handover on the cell that includes the Release 17 MUSIM Assistance configuration in its conditional reconfiguration. After evaluation of conditional reconfiguration, the UE (100) checks for inclusion of the MUSIM assistance configuration in otherconfig-r17 IE of the candidate cell conditional reconfiguration that satisfies the evaluation criteria. Based on the conditional reconfiguration, the UE (100) identifies the cells that include the release-17 MUSIM assistance configuration. For conditional handover, the UE (100) prioritizes the candidate cell that includes the MUSIM assistance configuration for the condition execution. As a result, the UE (100) moves to the MUSIM assistance configured cell during the conditional handover situation.

Consider an example of prioritizing the secondary cells for CHO according to an example embodiment as shown in the FIG. 6B. For example, during the evaluation, the two candidate cells gNB1 and gNB2 satisfy the condition simultaneously. The candidate cell gNB1 does not include the Release-17 MUSIM assistance configuration and the candidate cell gNB2 includes the Release-17 MUSIM assistance configuration in its conditional reconfiguration. The UE (100) checks for the MUSIM assistance configuration inclusion in the conditional reconfiguration of its candidate cells and identifies the cell that includes the MUSIM assistance information and executes the conditional handover to the candidate cell gNB2. So, in the new target cell gNB, the UE (100) can maintain connectivity in both the networks in the MUSIM device during switching between two networks.

Figure 7A:
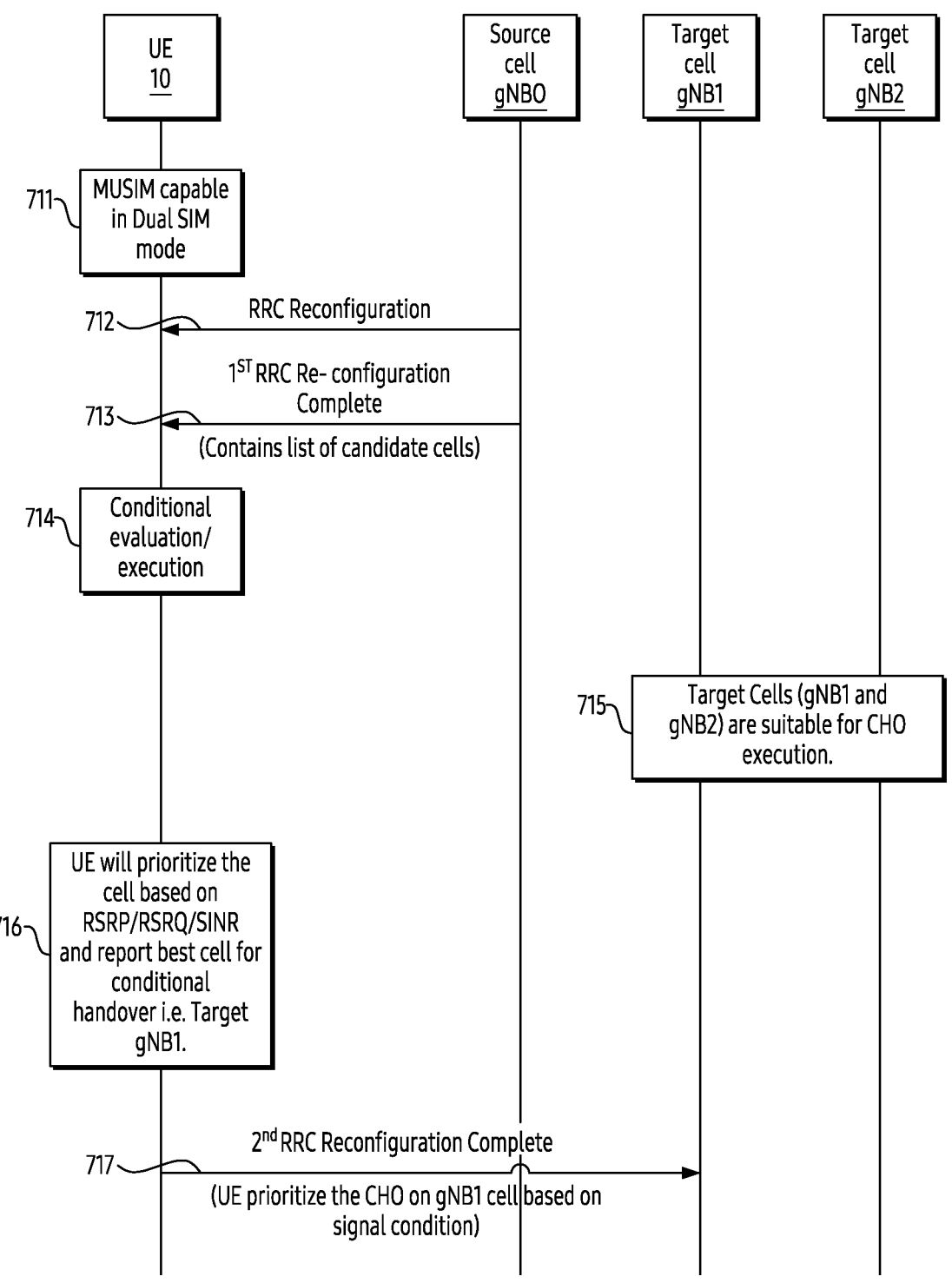
FIGS. 7A and 7B illustrate a comparison of sequence diagrams of an example embodiment and a related art method for prioritizing the secondary cells for the CHO.
Figure 7B:
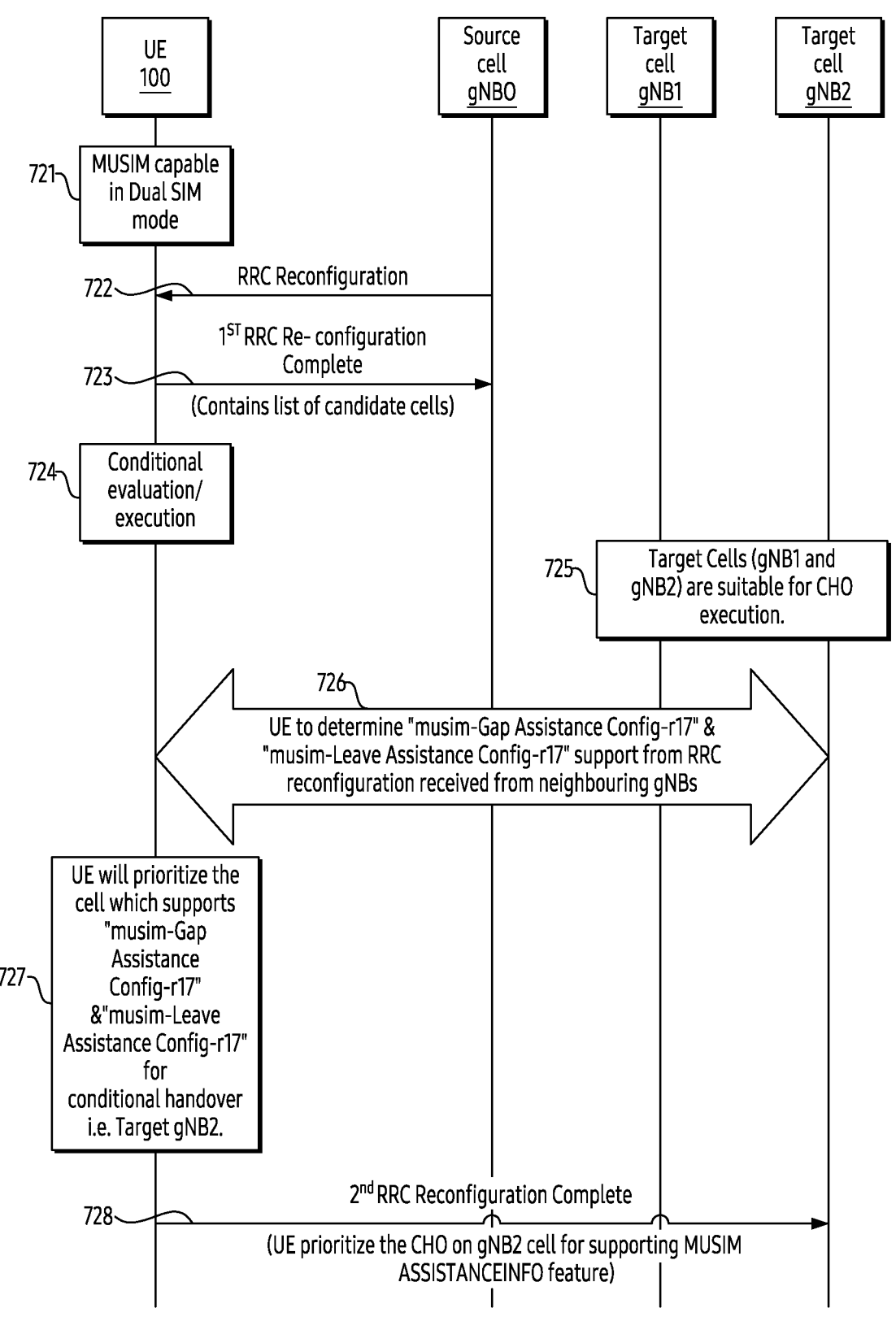

FIGS. 7A and 7B illustrate a comparison of sequence diagrams of an example embodiment and a related art method for prioritizing secondary cells for CHO.

FIG. 7A shows a sequence diagram of a related art method for prioritizing the secondary cells for the CHO. At 711, the UE (10) is a MUSIM device. At 712 and 713, the UE (10) is configured with multiple candidate cells for the conditional handover by a source cell (gNB0). At 714, during the evaluation, two candidate cells (gNB1, gNB2) are determined to satisfy the condition simultaneously. At 715, both the candidate cells (gNB1, gNB2) are suitable for the CHO execution, and the signal strength (e.g. RSRP/RSRQ/SINR) of the candidate cell (gNB1) is greater than that of the candidate cell (gNB2). The candidate cell (gNB1) does not include the Release-17 MUSIM assistance configuration and the candidate cell (gNB2) includes the Release-17 MUSIM assistance configuration in its conditional reconfiguration. At 716, in this scenario, the UE (10) prioritizes the candidate cell (gNB1) based on the signal strength. At 717, the UE (10) reports the candidate cell (gNB1) to the source cell (gNB0) for the conditional handover. Based on the signal strength, the UE (10) moves to the candidate cell gNB1 which does not include MUSIM assistance configuration. So the UE (10) moves to the cell that does not include the MUSIM assistance configuration. As a result, the UE (10) may not maintain connectivity in both the networks in the MUSIM device though the UE (10) had the chance to obtain it.

FIG. 7B shows a sequence diagram of an example embodiment for prioritizing the secondary cells for the CHO. At 721, the UE (100) is a MUSIM device. At 722 and 723, the UE (100) is configured with multiple candidate cells for the conditional handover by the source cell (gNB0). At 724, during the evaluation, two candidate cells (gNB1, gNB2) are determined to satisfy the condition simultaneously. At 725, both candidate cells (gNB1, gNB2) are determined to be suitable for CHO execution, and the signal strength (e.g. RSRP/RSRQ/SINR) of the candidate cell (gNB1) is greater than that of the candidate cell (gNB2). The candidate cell (gNB1) does not include the Release-17 MUSIM assistance configuration and the candidate cell (gNB2) includes the Release-17 MUSIM assistance configuration in its conditional reconfiguration. At 726, in this scenario, the UE (100) checks for the MUSIM assistance configuration inclusion in the conditional reconfiguration of its candidate cells and identifies the candidate cell (gNB2) that includes the MUSIM assistance information. At 727 and 728, the UE (100) prioritizes the candidate cell (gNB2) and executes the conditional handover to the candidate cell (gNB2). So, in the new target cell gNB, the UE (100) maintains connectivity in both networks in the MUSIM device during switching between two networks.

Figure 8A:
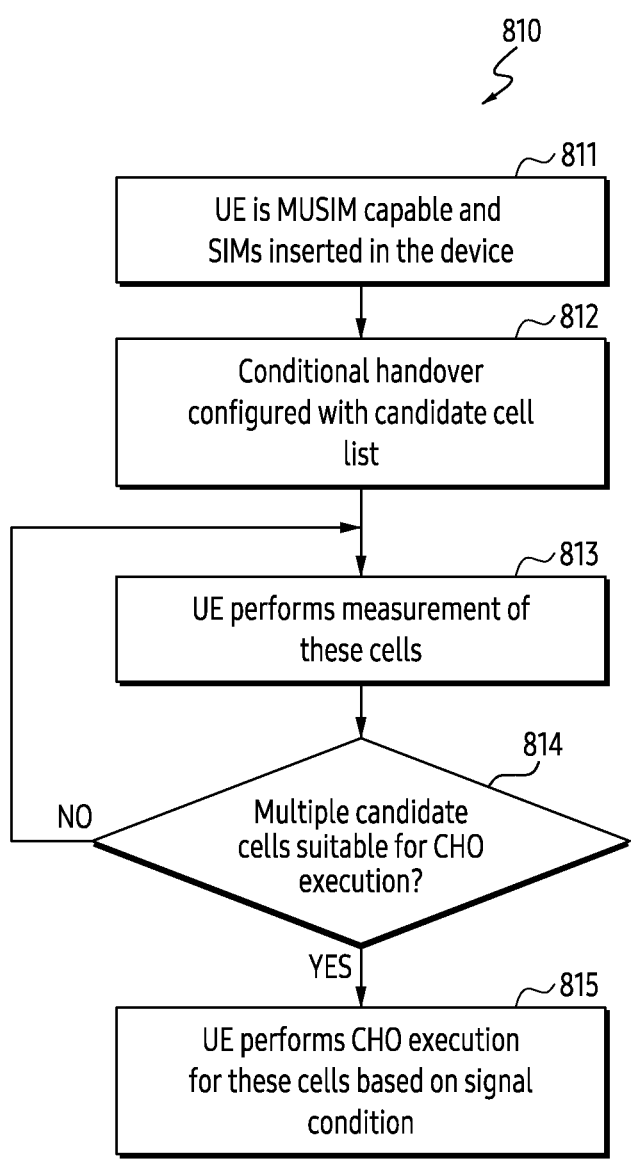
FIGS. 8A and 8B illustrates a comparison of flow diagrams of a related art method and a method according to an example embodiment for prioritizing the secondary cells for the CHO.
Figure 8B:
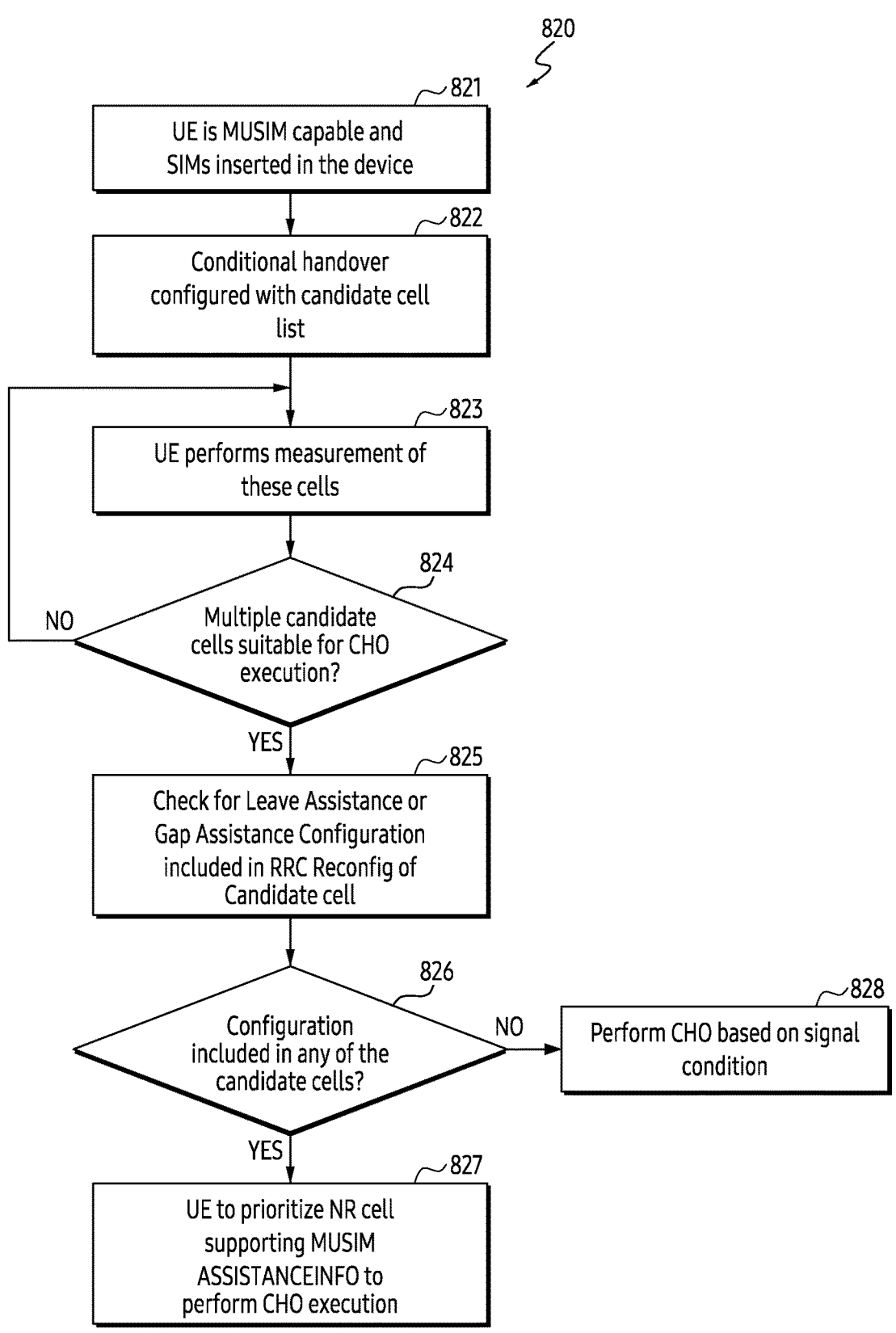

FIGS. 8A and 8B illustrate a comparison of flow diagrams of a related art method (810) and a method of an example embodiment (820) for prioritizing secondary cells for CHO. The related art method for prioritizing secondary cells for CHO is shown in the flow diagram (810) illustrated in FIG. 8A and includes steps 811, 812, 813, 814, and 815. At 811, the UE (10) is MUSIM capable and the SIMs (150A, 150B) are inserted in the UE (10). At 812, the CHO is configured at the UE (10) with a candidate cell list. At 813, the UE (10) performs the measurement of these candidate cells. At 814, the UE (10) checks whether the multiple candidate cells are suitable for the CHO execution. When none of the candidate cells is suitable for CHO execution, the UE (10) continues to perform step 813. At 815, upon detecting that multiple candidate cells are suitable for the CHO execution, the UE (10) performs CHO execution for these cells based on the signal condition. For example, when one candidate cell is suitable for CHO execution, the UE (10) may perform CHO execution for the one candidate cell based on the signal condition.

A method according to an example embodiment for prioritizing the secondary cells for CHO is shown in the flow diagram (820) illustrated in the FIG. 8B, and includes steps 821, 822, 823, 824, 825, 826, 827, and 828. At 821, the UE (100) is MUSIM capable and the SIMs (150A, 150B) are inserted in the UE (100). At 822, the CHO is configured at the UE (100) with a candidate cell list. At 823, the UE (100) performs measurement of these candidate cells. At 824, the UE (100) checks whether the multiple candidate cells are suitable for the CHO execution. When none of the candidate cells is suitable for the CHO execution, the UE (100) continues to perform step 823. At 825, upon detecting that multiple candidate cells are suitable for CHO execution, the UE (100) checks whether the leave assistance configuration or the gap assistance configuration is included in the RRC reconfiguration of the candidate cells. For example, the UE (100) may receive the RRC reconfiguration message of the candidate cells. For example, the UE (100) may identify whether the leave assistance configuration or the gap assistance configuration is included in the RRC reconfiguration of the candidate cells. At 826 and 827, when the leave assistance configuration or the gap assistance configuration is included in any of the RRC reconfiguration of the candidate cells, then the UE (100) prioritizes the candidate cell(s) supporting the MUSIM assistance information to perform the CHO execution. At 826 and 828, when the leave assistance configuration or the gap assistance configuration is not included in the RRC reconfiguration of the candidate cells, the UE (100) performs CHO execution for these cells based on a signal condition.

Consider an example scenario in which the UE (100) is MUSIM capable, supports dual SIM and performs measurement on a measurement object configured for NR band/frequencies. Consider the UE (100) has detected cells (gNB1-gNB4) given in table 4 during the conditional handover procedure.

TABLE 4

| Cells Detected | Signal Level | CHO criteria? |
|---|---|---|
| gNB1 | −80 dBm | Meet |
| gNB2 | −84 dBm | Meet |
| gNB3 | −110 dBm | Not meet |
| gNB4 | −119 dBm | Not meet |

Out of four cells (gNB1-gNB4), two cells (gNB1 & gNB2) meet the criteria for conditional handover. The other two cells (gNB3 & gNB4) do not meet the criteria for conditional handover. So the UE (100) needs to choose between the cells (gNB1 and gNB2) for CHO.

As per the related art method, the UE (10) performs measurement for multiple candidate cells configured in conditional reconfiguration received from the network. Further, the UE (10) prioritizes the cell for handover based on the signal condition among the candidate cells that meet the condition configured as given in table 5 and performs the handover to that cell. In this case, the UE (10) would camp on the cell (gNB1) which does not include MUSIM assistance information.

TABLE 5

| Cells Detected | Signal Level | CHO criteria? | MUSIM Assistance Configuration? |
|---|---|---|---|
| gNB1 | −80 dBm | Meet | Not Included |
| gNB2 | −84 dBm | Meet | Included |
| gNB3 | −110 dBm | Not meet | Included |
| gNB4 | −119 dBm | Not meet | Not Included |

With a method of an example embodiment, the UE (100) prioritizes the cell (gNB2) that includes the MUSIM assistance configuration containing "musim-LeaveAssistanceConfig-r17" IE or "musim GapAssistanceConfig-r17" IE in the RRC reconfiguration during CHO as given in table 6 and moves to that cell (gNB2).

TABLE 6

| Cells Detected | Signal Level | CHO criteria? | MUSIM Assistance Configuration |
|---|---|---|---|
| gNB2 | −84 dBm | Meet | Included |
| gNB1 | −80 dBm | Meet | Not Included |
| gNB3 | −110 dBm | Not meet | Included |
| gNB4 | −119 dBm | Not meet | Not Included |

Figure 9A:
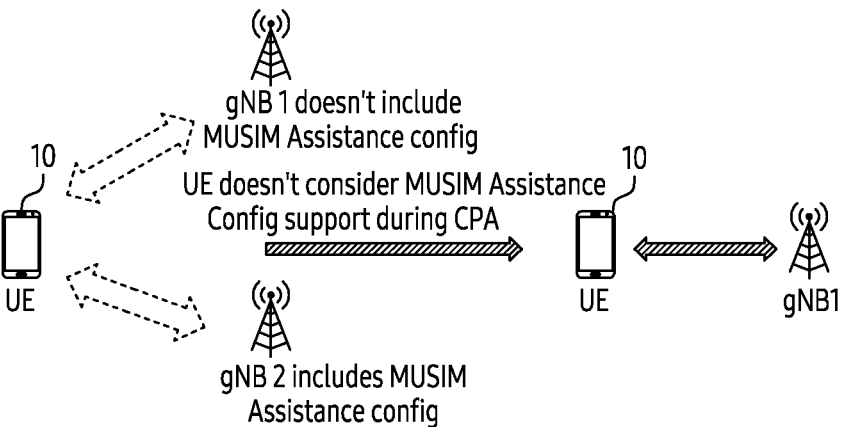
FIGS. 9A and 9B illustrate a comparison of example scenarios of prioritizing the secondary cells for a CPA according to an example embodiment and a related art method.
Figure 9B:
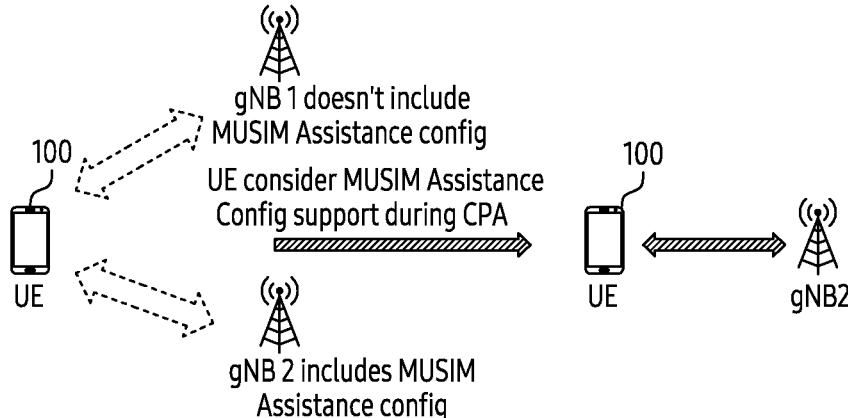

FIGS. 9A and 9B illustrate a comparison of example scenarios of prioritizing the secondary cells for the CPA according to an example embodiment and the related art. Consider the UE (10) is a MUSIM capable device and the RRC connected mode is enabled in the UE (10). The network has configured the UE (10) with a list of candidate cells for the conditional handover. The UE (10) measures the candidate cells and evaluates the conditional reconfiguration of these cells. If any of the candidate neighbor cells satisfies the condition criteria, then the UE (10) executes the conditional PS cell addition to it. Currently, the UE (10) performs the conditional PS cell addition on the cell based on the signal strength irrespective of any feature support in the other candidate cells and no priority is considered when multiple cells satisfies the evaluation criteria.

Consider an example of prioritizing the secondary cells for the conditional PS cell addition according to a related art method as shown in FIG. 9A. For example, consider the UE (10) is a MUSIM device and configured with multiple candidate cells for conditional PS cell addition. During the evaluation, two candidate cells gNB1 and gNB2 are determined to satisfy the condition simultaneously. The candidate cell gNB1 does not include the Release-17 MUSIM assistance configuration and the candidate cell gNB2 includes the Release-17 MUSIM assistance configuration in its conditional reconfiguration. In this scenario, the UE (10) executes the conditional PS cell addition to the candidate cell gNB1 without considering any kind of prioritization. Based on the signal strength, the UE (10) adds the candidate cell gNB1 that does not include MUSIM assistance configuration. So the UE (10) adds the PSCell that does not include the MUSIM assistance configuration. As a result, the UE (10) may not maintain connectivity in both networks in the MUSIM device though the UE (10) had the chance to obtain it.

As per a method of an example embodiment, during conditional PS cell addition when the network configures a list of candidate cells and multiple candidate cells satisfy the evaluation criteria, then the UE (100) will prioritize the execution of the conditional PS cell addition on a cell that includes the Release 17 MUSIM Assistance configuration in its conditional reconfiguration. After evaluation of the conditional reconfiguration, the UE (100) checks for inclusion of the MUSIM assistance configuration in otherconfig-r17 IE of the candidate cell conditional reconfiguration that satisfies the evaluation criteria. Based on the conditional reconfiguration, the UE (100) identifies the cells that include the release-17 MUSIM assistance configuration. For conditional PS cell addition, the UE (100) prioritizes the candidate cell that includes the MUSIM assistance configuration for the condition execution. As a result, the UE (100) moves to the MUSIM assistance configured cell during the conditional PS cell addition.

Consider an example of prioritizing secondary cells for the conditional PS cell addition according to a method of an example embodiment as shown in FIG. 9B. For example, during the evaluation, the two candidate cells gNB1 and gNB2 satisfy the condition simultaneously. The candidate cell gNB1 does not include the Release-17 MUSIM assistance configuration and the candidate cell gNB2 includes the Release-17 MUSIM assistance configuration in its conditional reconfiguration. The UE (100) checks for the MUSIM assistance configuration inclusion in the conditional reconfiguration of its candidate cells and identifies the cell that includes the MUSIM assistance information and executes the conditional PS cell addition to the candidate cell gNB2. So, in the new target cell gNB, the UE (100) maintains connectivity in both networks in the MUSIM device during switching between two networks.

Figure 10A:
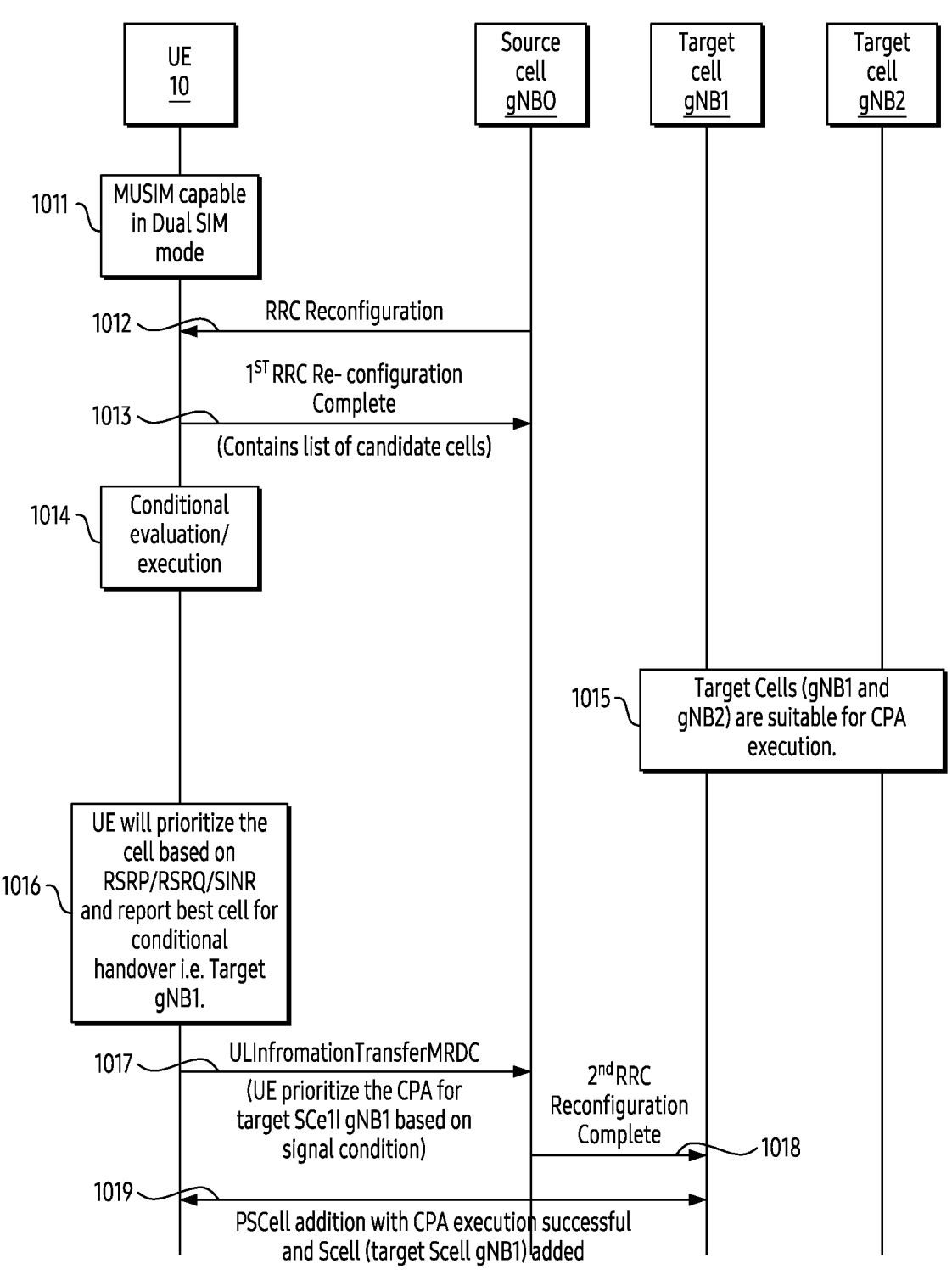
FIGS. 10A and 10B illustrate a comparison of sequence diagrams of a method of an example embodiment and a related art method for prioritizing the secondary cells for the CPA.
Figure 10B:
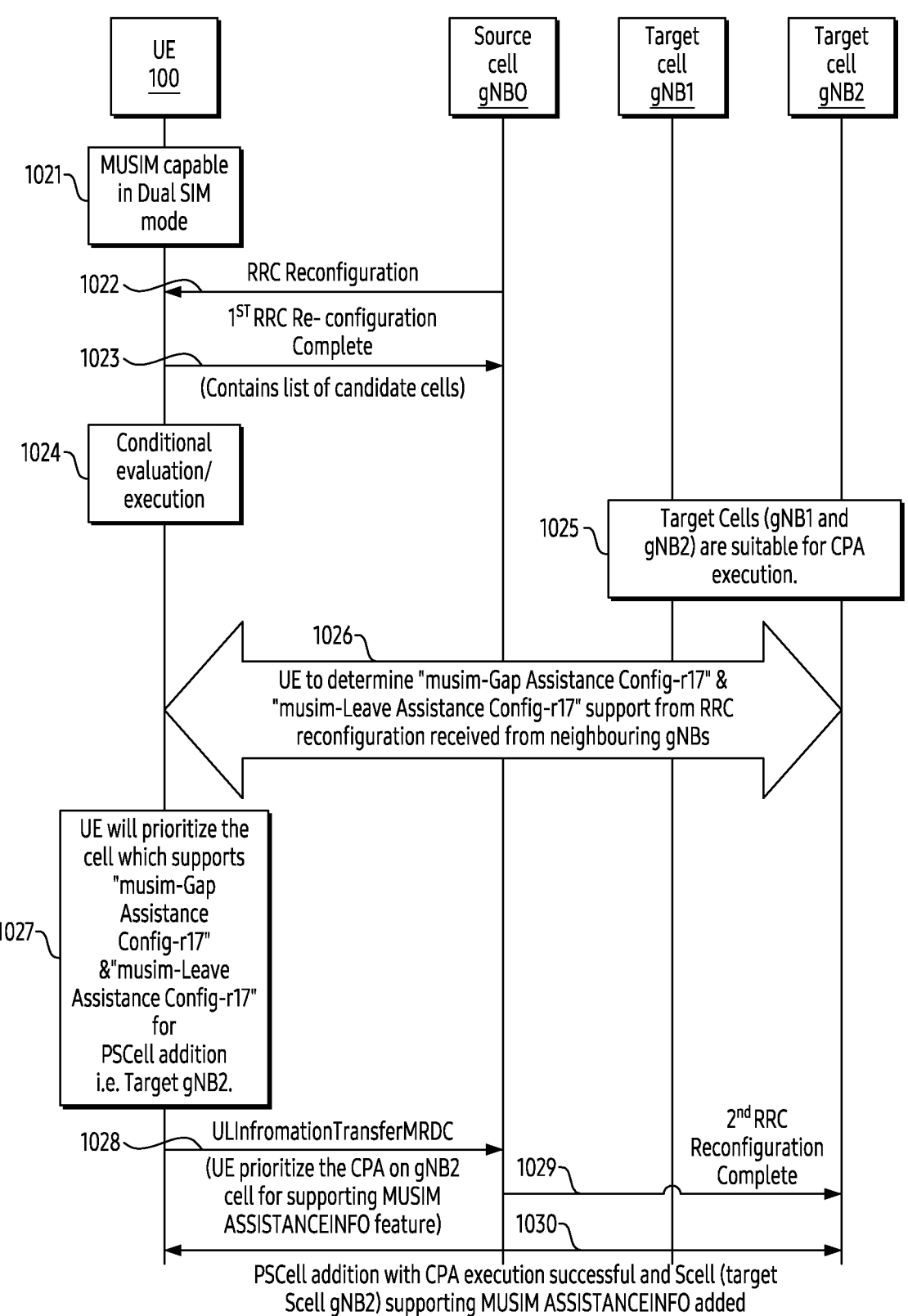

FIGS. 10A and 10B illustrate a comparison of sequence diagrams of a method of a example embodiment a related art method for prioritizing secondary cells for CPA.

FIG. 10A shows a sequence diagram of a related art method for prioritizing secondary cells for CPA. At 1011, the UE (10) is a MUSIM device. At 1012 and 1013, the UE (10) is configured with the multiple candidate cells for the CPA by the source cell (gNB0). At 1014, during the evaluation, two candidate cells (gNB1, gNB2) are determined to satisfy the condition simultaneously. At 1015, both the candidate cells (gNB1, gNB2) are suitable for CPA execution, and the signal strength (e.g. RSRP/RSRQ/SINR) of the candidate cell (gNB1) is greater than that of the candidate cell (gNB2). The candidate cell (gNB1) does not include the Release-17 MUSIM assistance configuration and the candidate cell (gNB2) includes the Release-17 MUSIM assistance configuration in its conditional reconfiguration. At 1016, in this scenario, the UE (10) prioritizes the candidate cell (gNB1) based on the signal strength. At 1017, the UE (10) reports the candidate cell (gNB1) to the source cell (gNB0) for CPA. Based on the signal strength, the UE (10) moves to the candidate cell gNB1 (1018 and 1019) which does not include MUSIM assistance configuration. So the UE (10) moves to the cell that does not include the MUSIM assistance configuration. As a result, the UE (10) may not maintain connectivity in both networks in the MUSIM device though the UE (10) had the chance to obtain it.

The FIG. 10B shows a sequence diagram of a method according to an example embodiment for prioritizing secondary cells for CPA. At 1021, the UE (100) is a MUSIM device. At 1022 and 1023, the UE (100) is configured with multiple candidate cells for CPA by the source cell (gNB0). At 1024, during the evaluation, two candidate cells (gNB1, gNB2) satisfy the condition simultaneously. At 1025, both candidate cells (gNB1, gNB2) are suitable for CPA execution, and the signal strength (e.g. RSRP/RSRQ/SINR) of the candidate cell (gNB1) is greater than that of the candidate cell (gNB2). The candidate cell (gNB1) does not include the Release-17 MUSIM assistance configuration and the candidate cell (gNB2) includes the Release-17 MUSIM assistance configuration in its conditional reconfiguration. At 1026, in this scenario, the UE (100) checks for the MUSIM assistance configuration inclusion in the conditional reconfiguration of its candidate cells and identifies the candidate cell (gNB2) that includes the MUSIM assistance information. At 1027 and 1028, the UE (100) prioritizes the candidate cell (gNB2), and reports the prioritization to the source cell (gNB0). At 1029, the source cell (gNB0) reports the prioritization to the candidate cell (gNB2) to provide the service to the UE (100). At 1030, the PSCell addition with the CPA execution is successful and the cell (gNB2) supporting the MUSIM assistance information is added. So in the new target cell gNB, the UE (100) maintains connectivity in both networks in the MUSIM device during switching between two networks.

Figure 11A:
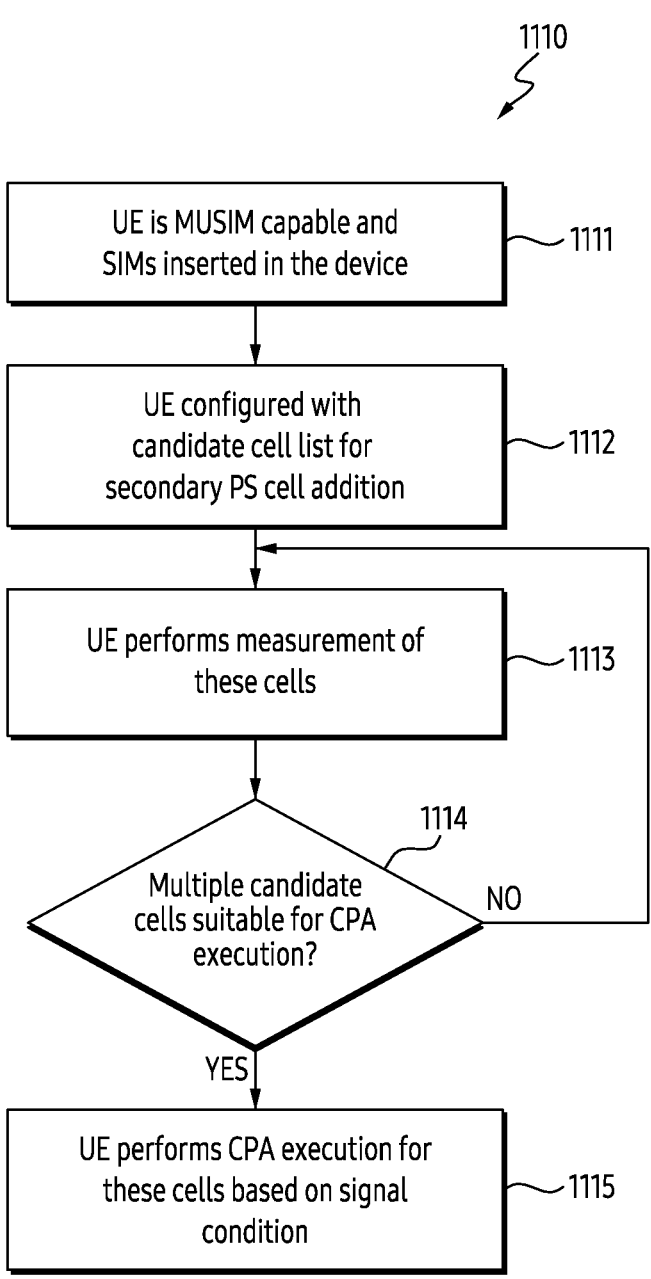
FIGS. 11A and 11B illustrate a comparison of flow diagrams of a related art method and a method according to an example embodiment for prioritizing the secondary cells for the CPA.
Figure 11B:
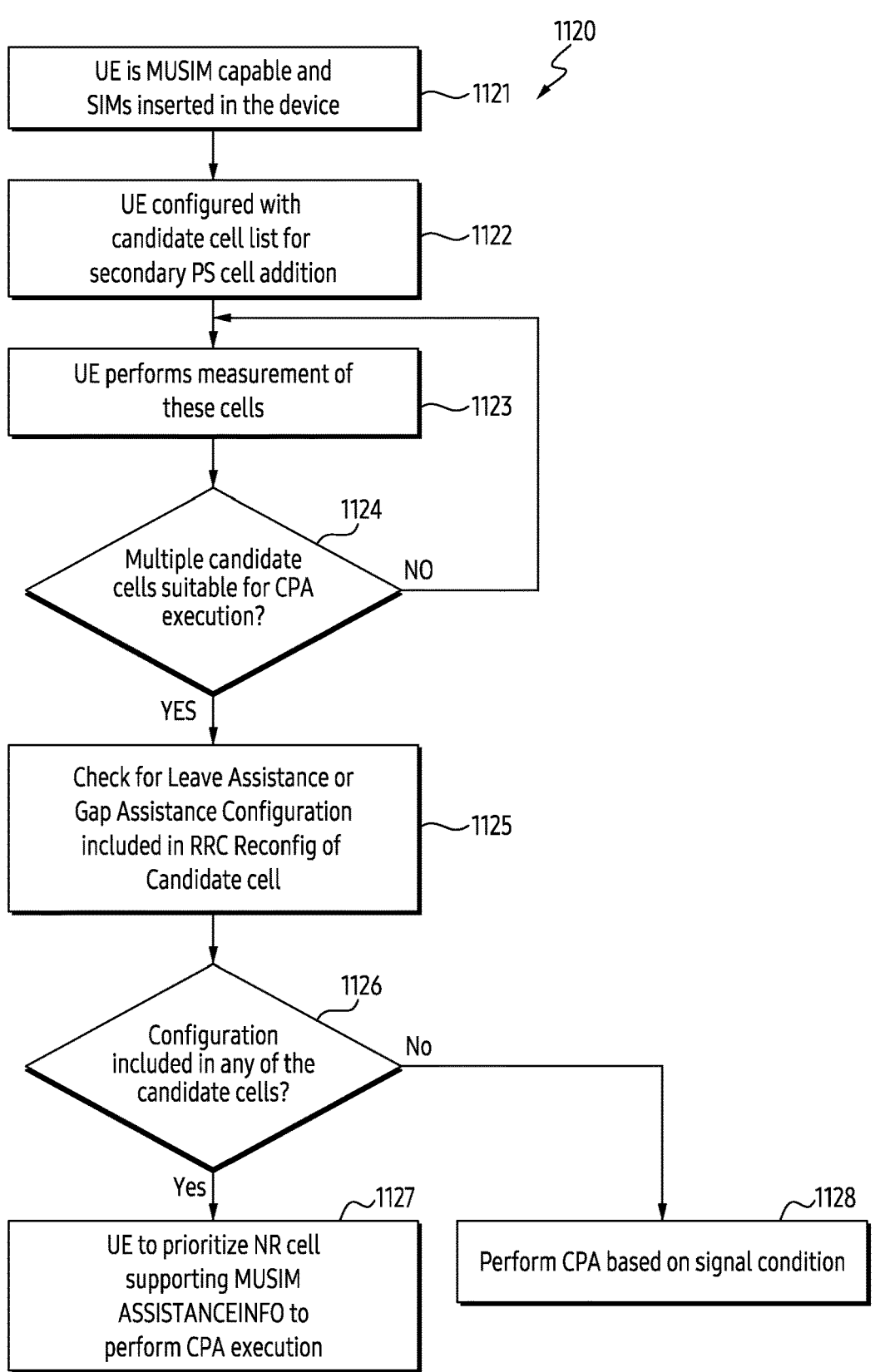

FIGS. 11A and 11B illustrate a comparison of flow diagrams of a related art method (1110) and a method (1120) according to an example embodiment for prioritizing secondary cells for CPA. The related art method for prioritizing secondary cells for CPA is shown in the flow diagram (1110) illustrated in FIG. 11A and includes steps 1111, 1112, 1113, 1114, and 1115. At 1111, the UE (10) is MUSIM capable and the SIMs (150A, 150B) are inserted in the UE (10). At 1112, the CPA is configured at the UE (10) with the candidate cell list. At 1113, the UE (10) performs measurement of these candidate cells. At 1114, the UE (10) checks whether multiple candidate cells are suitable for the CPA execution. When none of the candidate cells is suitable for the CPA execution, the UE (10) continues to perform step 1113. At 1115, upon detecting that multiple candidate cells are suitable for CPA execution, the UE (10) performs CPA execution for these cells based on signal condition. For example, when one candidate cell is suitable for CPA execution, the UE (10) may perform CPA execution for the one candidate cell based on the signal condition.

A method according to an example embodiment for prioritizing secondary cells for CPA is shown in the flow diagram (1120) illustrated in FIG. 11B and includes steps 1121, 1122, 1123, 1124, 1125, 126, 1127, and 1128. At 1121, the UE (100) is MUSIM capable and the SIMs (150A, 150B) are inserted in the UE (100). At 1122, the CPA is configured at the UE (100) with a candidate cell list. At 1123, the UE (100) performs measurement of these candidate cells. At 1124, the UE (100) checks whether multiple candidate cells are suitable for the CPA execution. When none of the candidate cells is suitable for CPA execution, the UE (100) continues to perform step 1123. At 1125, upon detecting that multiple candidate cells are suitable for the CPA execution, the UE (100) checks whether the leave assistance configuration or the gap assistance configuration is included in the RRC reconfiguration of the candidate cells. For example, the UE (100) may receive the RRC reconfiguration message of the candidate cells. For example, the UE (100) may identify whether the leave assistance configuration or the gap assistance configuration is included in the RRC reconfiguration of the candidate cells. At 1126 and 1127, when the leave assistance configuration or the gap assistance configuration is included in the RRC reconfiguration of the candidate cells, then the UE (100) prioritizes the candidate cell supporting the MUSIM assistance information to perform the CPA execution. At 1126 and 1128, when the leave assistance configuration or the gap assistance configuration is not included in the RRC reconfiguration of the candidate cells, the UE (100) performs the CPA execution for these cells based on signal condition.

Consider an example scenario in which the UE (100) is MUSIM capable, supports dual SIM and performs the measurement on the measurement object configured for NR band/frequencies. Consider, the UE (100) has detected cells (gNB1-gNB4) given in table 7 during the conditional PSCell addition procedure.

TABLE 7

| Cells Detected | Signal Level | CPA criteria? |
|---|---|---|
| gNB1 | −680 dBm | Meet |
| gNB2 | −684 dBm | Meet |
| gNB3 | −6110 dBm | Not meet |
| gNB4 | −6119 dBm | Not meet |

Out of four cells (gNB1-gNB4), two cells (gNB1 & gNB2) meet the criteria for the PSCell addition procedure. The other two cells (gNB3 & gNB4) do not meet the criteria for the PSCell addition procedure. So the UE (100) needs to choose between the cells (gNB1 and gNB2) for CPA.

As per the related art, the UE (10) performs measurement for multiple candidate cells configured in conditional reconfiguration received from the network. Further, the UE (10) prioritizes the cell for handover based on the signal condition among the candidate cells that meet the condition configured as given in table 8 and performs the PScell addition to that cell as SCG based on the signal condition.

In this case, the UE (10) would add the cell (gNB1) which does not include MUSIM assistance information.

TABLE 8

| Cells Detected | Signal Level | CPA criteria? | MUSIM Assistance Configuration? |
|---|---|---|---|
| gNB1 | −80 dBm | Meet | Not Included |
| gNB2 | −84 dBm | Meet | Included |
| gNB3 | −110 dBm | Not meet | Included |
| gNB4 | −119 dBm | Not meet | Not Included |

With a method according to an example embodiment, the UE (100) prioritizes the cell (gNB2) that includes the MUSIM assistance configuration containing "musim-LeaveAssistanceConfig-r17" IE or "musim GapAssistanceConfig-r17" IE in the RRC reconfiguration during the CPA as given in table 9 and adds the cell (gNB2) as SCG.

TABLE 9

| Cells Detected | Signal Level | CPA criteria? | MUSIM Assistance Configuration |
|---|---|---|---|
| gNB2 | −84 dBm | Meet | Included |
| gNB1 | −80 dBm | Meet | Not Included |
| gNB3 | −110 dBm | Not meet | Included |
| gNB4 | −119 dBm | Not meet | Not Included |

Figure 12A:
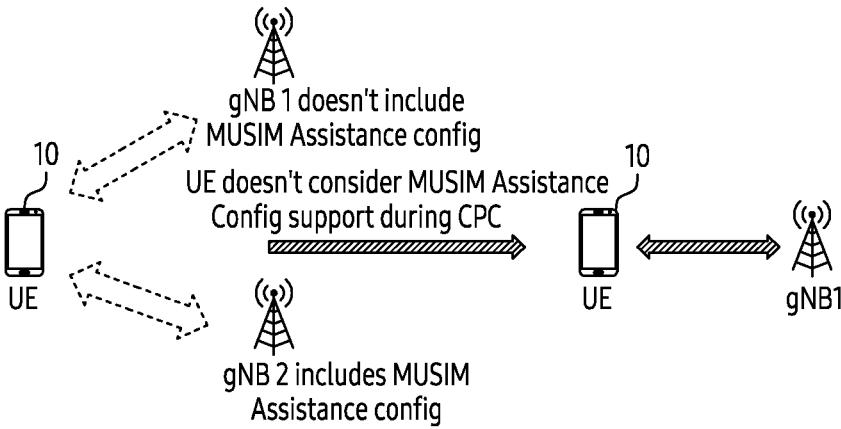
FIGS. 12A and 12B illustrate a comparison of example scenarios of prioritizing the secondary cells for a CPC according to an example embodiment and a related art method.
Figure 12B:
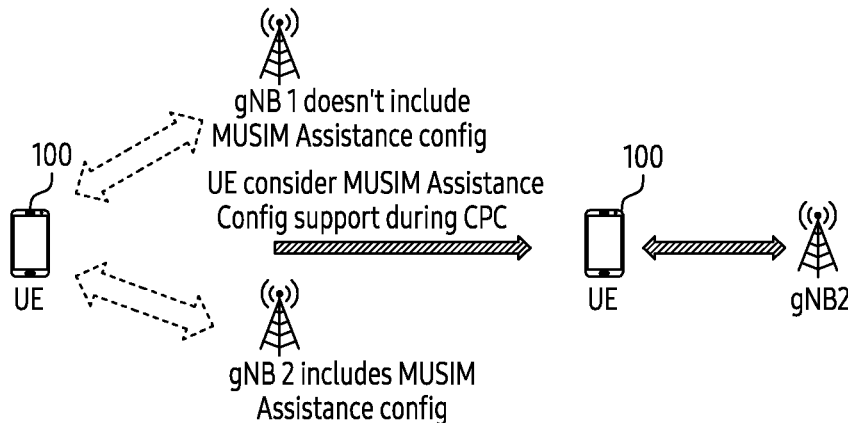

FIGS. 12A and 12B illustrate a comparison of example scenarios of prioritizing the secondary cells for the CPC according to a method of an example embodiment and a related art method. Consider, the UE (10) is a MUSIM capable device and the RRC connected mode is enabled in the UE (10). The network has configured the UE (10) with a list of candidate cells for the conditional handover. The UE (10) measures the candidate cells and evaluates the conditional reconfiguration of these cells. If any of the candidate neighbor cells satisfies the condition criteria then the UE (10) executes the conditional PS cell change to it. Currently, the UE (10) performs the conditional PS cell change on the cell based on the signal strength irrespective of any feature support in the other candidate cells and no priority is considered when multiple cells satisfy the evaluation criteria.

Consider an example of prioritizing secondary cells for the conditional PS cell change according to a related art method as shown in FIG. 12A. For example, consider the UE (10) is a MUSIM device and configured with multiple candidate cells for the conditional PS cell change. During the evaluation, two candidate cells gNB1 and gNB2 satisfy the condition simultaneously. The candidate cell gNB1 does not include the Release-17 MUSIM assistance configuration and the candidate cell gNB2 includes the Release-17 MUSIM assistance configuration in its conditional reconfiguration. In this scenario, the UE (10) executes the conditional PS cell change to the candidate cell gNB1 without considering any kind of prioritization. Based on the signal strength, the UE (10) changes the candidate cell gNB1 which does not include MUSIM assistance configuration. So the UE (10) changes the PSCell that does not include the MUSIM assistance configuration. As a result, the UE (10) may not maintain connectivity in both networks in the MUSIM device though the UE (10) had the chance to obtain it.

As per a method according to an example embodiment, during the conditional PS cell change when the network configures the list of candidate cells and multiple candidate cells satisfy the evaluation criteria, then the UE (100) will prioritize the execution of the conditional PS cell change on the cell that includes the Release-17 MUSIM Assistance configuration in its conditional reconfiguration. After evaluation of the conditional reconfiguration, the UE (100) checks for inclusion of the MUSIM assistance configuration in otherconfig-r17 IE of the candidate cell conditional reconfiguration that satisfies the evaluation criteria. Based on the conditional reconfiguration, the UE (100) identifies the cells that include the release-17 MUSIM assistance configuration. For the conditional PS cell change, the UE (100) prioritizes the candidate cell that includes the MUSIM assistance configuration for the condition execution. As a result, the UE (100) moves to the MUSIM assistance configured cell during the conditional PS cell change.

Consider an example of prioritizing secondary cells for a conditional PS cell change according to a method of an example embodiment as shown in the FIG. 12B. For example, during the evaluation, the two candidate cells gNB1 and gNB2 satisfy the condition simultaneously. The candidate cell gNB1 does not include the Release-17 MUSIM assistance configuration and the candidate cell gNB2 includes the Release-17 MUSIM assistance configuration in its conditional reconfiguration. The UE (100) checks for the MUSIM assistance configuration inclusion in the conditional reconfiguration of its candidate cells and identifies the cell that includes the MUSIM assistance information and executes the conditional PS cell change to the candidate cell gNB2. So in the new target cell gNB, the UE (100) maintains connectivity in both networks in the MUSIM device during switching between two networks.

Figure 13A:
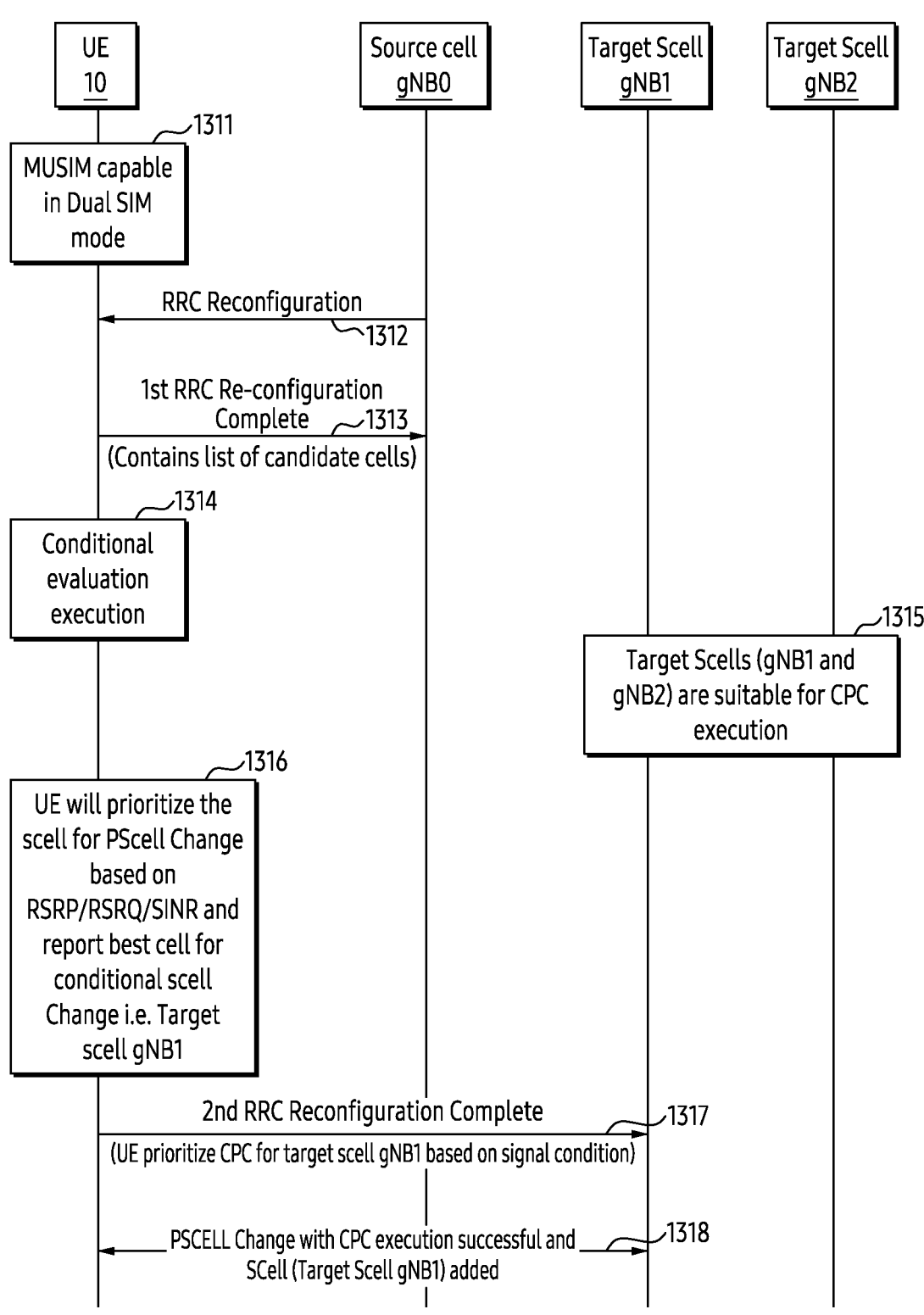
FIGS. 13A and 13B illustrate a comparison of sequence diagrams of a method according to an example embodiment and a related art method for prioritizing the secondary cells for the CPC.
Figure 13B:
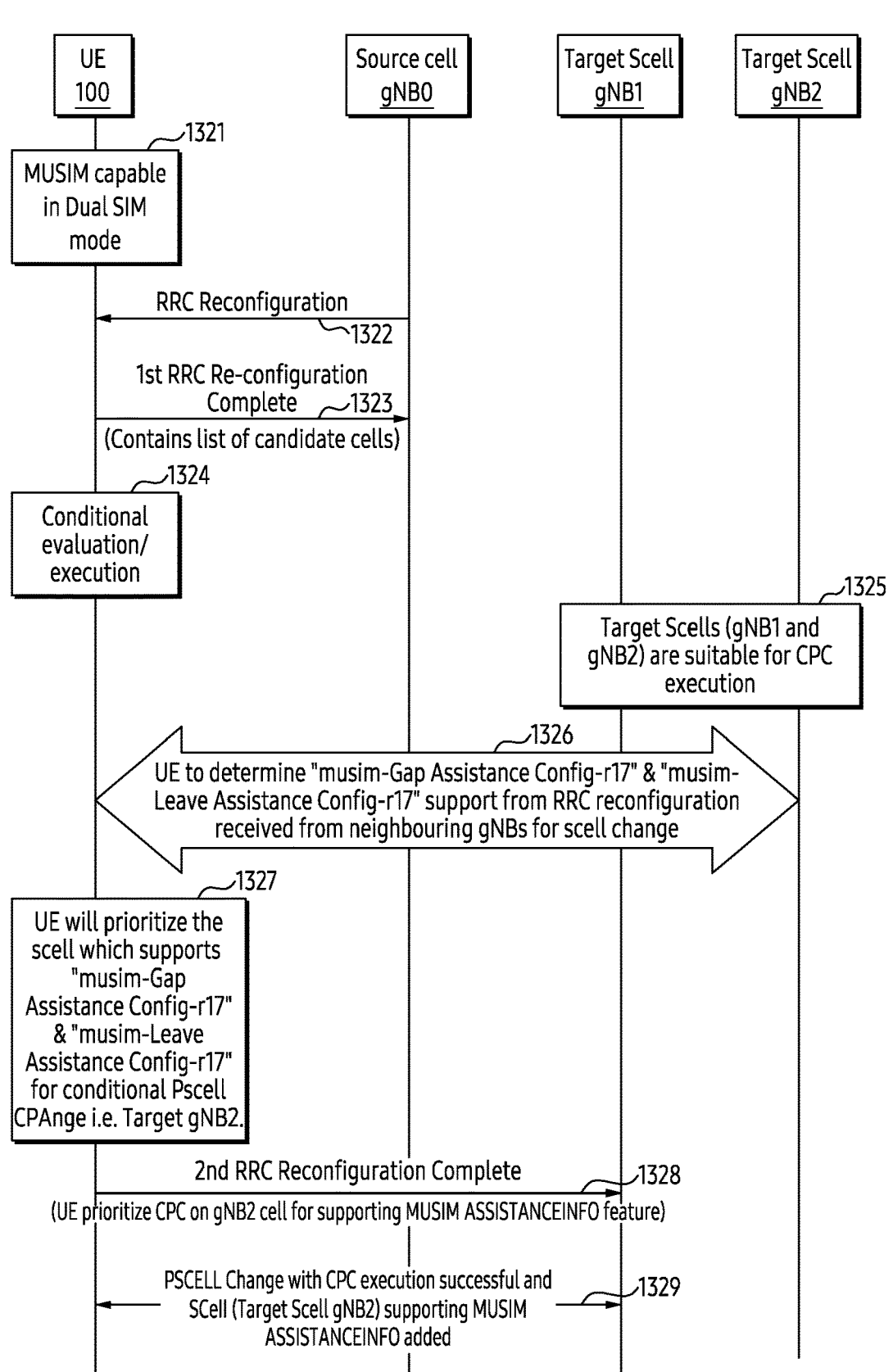

FIGS. 13A and 13B illustrate a comparison of sequence diagrams of a method according to an example embodiment and a related art method for prioritizing the secondary cells for the CPC.

FIG. 13A shows a sequence diagram of a related art method for prioritizing the secondary cells for the CPC. At 1311, the UE (10) is a MUSIM device. At 1312 and 1313, the UE (10) is configured with multiple candidate cells for CPC by the source cell (gNB0). At 1314, during the evaluation, two candidate cells (gNB1, gNB2) satisfy the condition simultaneously. At 1315, both candidate cells (gNB1, gNB2) are suitable for CPC execution, and the signal strength (e.g. RSRP/RSRQ/SINR) of the candidate cell (gNB1) is greater than that of the candidate cell (gNB2). The candidate cell (gNB1) does not include the Release-17 MUSIM assistance configuration and the candidate cell (gNB2) includes the Release-17 MUSIM assistance configuration in its conditional reconfiguration. At 1316, in this scenario, the UE (10) prioritizes the candidate cell (gNB1) based on signal strength. At 1317, the UE (10) reports the candidate cell (gNB1) to the cell (gNB1) for the CPC. At 1318, based on the signal strength, the UE (10) moves to the candidate cell (gNB1) that does not include the MUSIM assistance configuration. So the UE (10) moves to the cell that does not include the MUSIM assistance configuration. As a result, the UE (10) may not maintain connectivity in both networks in the MUSIM device though the UE (10) had the chance to obtain it.

FIG. 13B shows a sequence diagram of a method according to an example embodiment for prioritizing secondary cells for CPC. At 1321, the UE (100) is a MUSIM device. At 1322 and 1323, the UE (100) is configured with multiple candidate cells for CPC by the source cell (gNB0). At 1324, during the evaluation, two candidate cells (gNB1, gNB2) satisfy the condition simultaneously. At 1325, both the candidate cells (gNB1, gNB2) are suitable for the CPC execution, and the signal strength (e.g. RSRP/RSRQ/SINR) of the candidate cell (gNB1) is greater than that of the candidate cell (gNB2). The candidate cell (gNB1) does not include the Release-17 MUSIM assistance configuration and the candidate cell (gNB2) includes the Release-17 MUSIM assistance configuration in its conditional reconfiguration. At 1326, in this scenario, the UE (100) checks for the MUSIM assistance configuration inclusion in the conditional reconfiguration of its candidate cells and identifies the candidate cell (gNB2) that includes the MUSIM assistance information. At 1327 and 1328, the UE (100) prioritizes the candidate cell (gNB2), and reports the prioritization to the candidate cell (gNB2) for the CPC. At 1329, the PSCell change with CPC execution is successful and the cell (gNB2) supporting the MUSIM assistance information is changed. So in the new target cell gNB, the UE (100) maintains connectivity in both networks in the MUSIM device during switching between two networks.

Figure 14A:
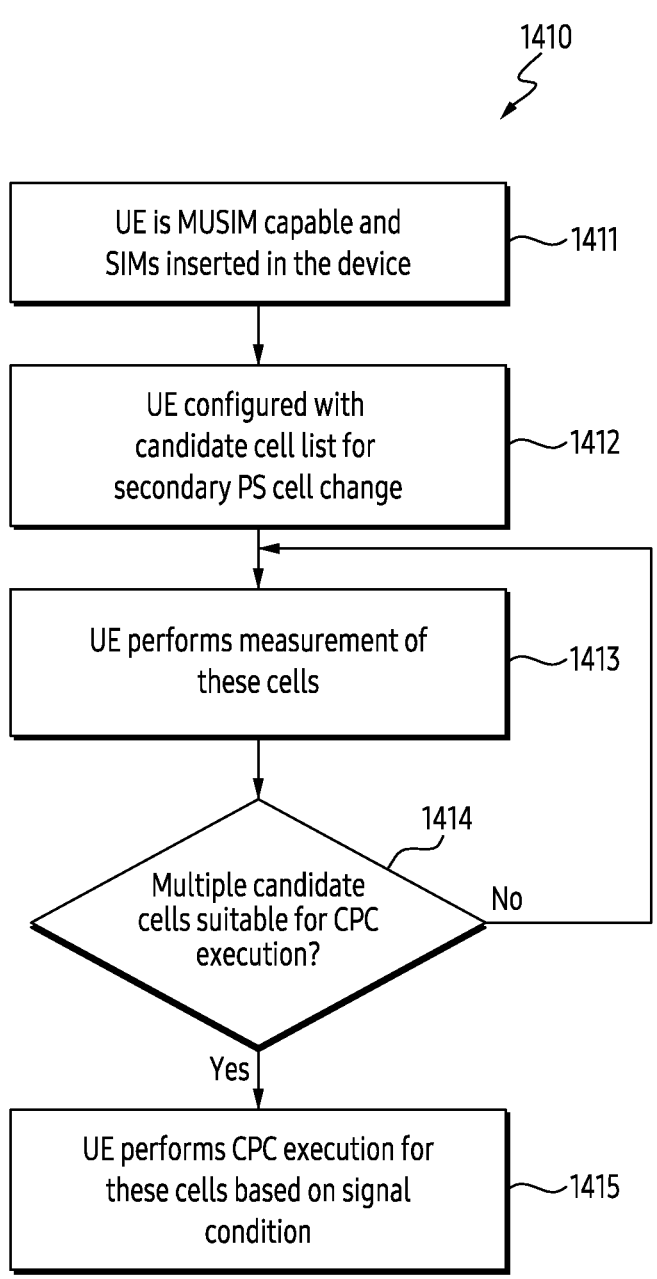
FIGS. 14A and 14B illustrate a comparison of flow diagrams of a related art method and a method according to an embodiment for prioritizing the secondary cells for the CPC.
Figure 14B:
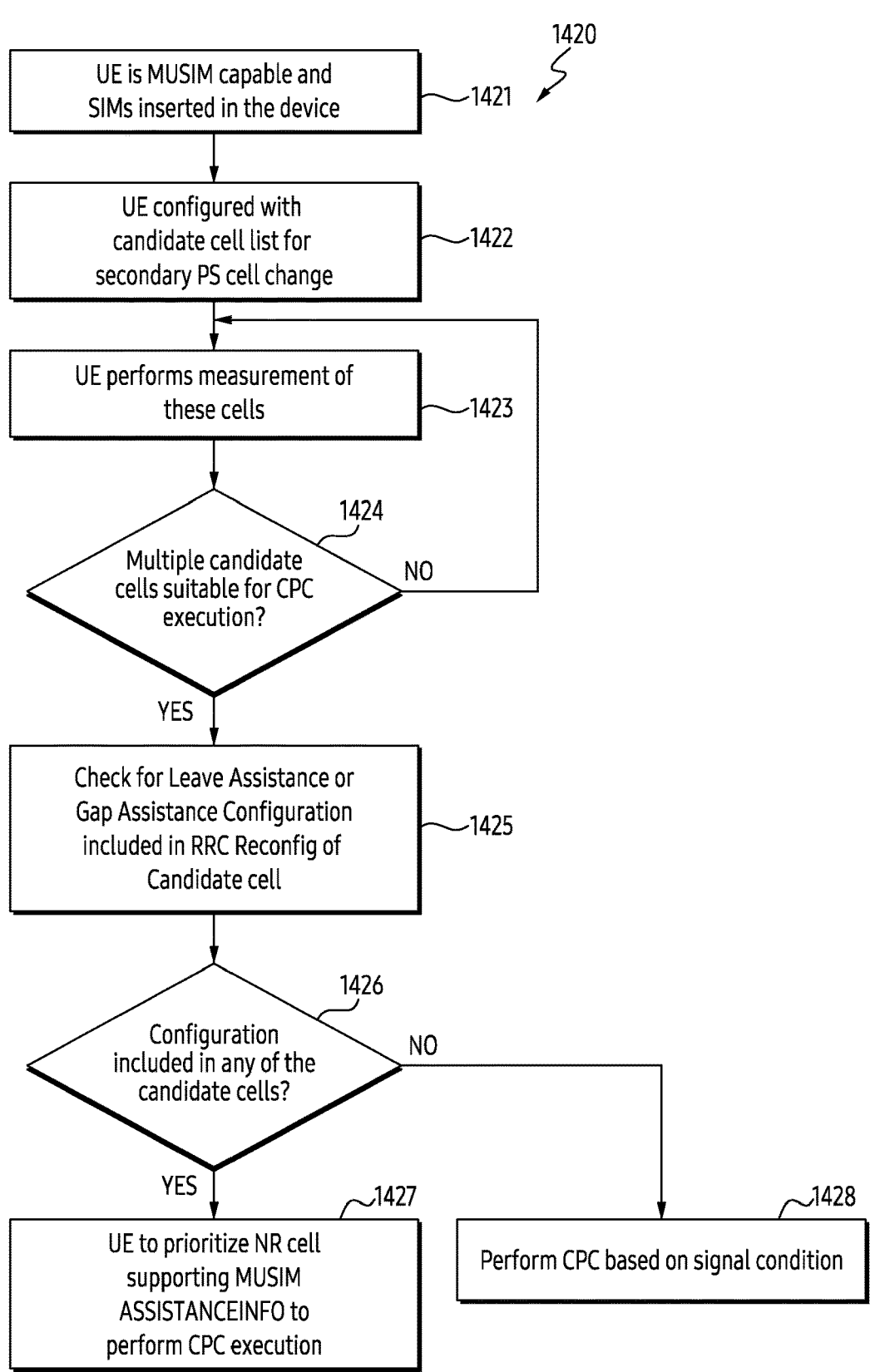

FIGS. 14A and 14B illustrate a comparison of flow diagrams of a related art method (1410) and a method (1420) according to an example embodiment for prioritizing secondary cells for CPC. The related art method for prioritizing secondary cells for CPC is shown in the flow diagram (1410) illustrated in the FIG. 14A and includes steps 1411, 1412, 1413, 1414 and 1415. At 1411, the UE (10) is MUSIM capable and the SIMs (150A, 150B) are inserted in the UE (10). At 1412, the CPC is configured at the UE (10) with a candidate cell list. At 1413, the UE (10) performs measurement of these candidate cells. At 1414, the UE (10) checks whether multiple candidate cells are suitable for the CPC execution. When none or one of the candidate cells are suitable for CPC execution, the UE (10) continues to perform step 1413. At 1415, upon detecting that multiple candidate cells are suitable for CPC execution, the UE (10) performs CPC execution for these cells based on the signal condition. For example, when one candidate cell is suitable for CPC execution, the UE (10) may perform CPC execution for the one candidate cell based on the signal condition.

A method according to an example embodiment for prioritizing the secondary cells for the CPC is shown in the flow diagram (1420) illustrated in FIG. 14B and includes steps 1421, 1422, 1423, 1424, 1425, 1426, 1427, and 1428. At 1421, the UE (100) is MUSIM capable and the SIMs (150A, 150B) are inserted in the UE (100). At 1422, the CPC is configured at the UE (100) with a candidate cell list. At 1423, the UE (100) performs the measurement of these candidate cells. At 1424, the UE (100) checks whether the multiple candidate cells are suitable for the CPC execution. When none or one of the candidate cells is suitable for the CPC execution, the UE (100) continues to perform step 1423. At 1425, upon detecting that multiple candidate cells are suitable for CPC execution, the UE (100) checks whether the leave assistance configuration or the gap assistance configuration is included in the RRC reconfiguration of the candidate cells. For example, the UE (100) may receive the RRC reconfiguration message of the candidate cells. For example, the UE (100) may identify whether the leave assistance configuration or the gap assistance configuration is included in the RRC reconfiguration of the candidate cells. At 1426 and 1427, when the leave assistance configuration or the gap assistance configuration is included in the RRC reconfiguration of the candidate cells, then the UE (100) prioritizes the candidate cell supporting the MUSIM assistance information to perform the CPC execution. At 1426 and 1428, when the leave assistance configuration or the gap assistance configuration is not included in the RRC reconfiguration of the candidate cells, the UE (100) performs CPC execution for these cells based on the signal condition.

Consider an example scenario in which the UE (100) is MUSIM capable, supports dual SIM and performs the measurement on the measurement object configured for NR band/frequencies. Consider, the UE (100) has detected cells (gNB1-gNB4) given in table 10 during the conditional PSCell change procedure.

TABLE 10

| Cells Detected | Signal Level | CPC criteria? |
|---|---|---|
| gNB1 | −80 dBm | Meet |
| gNB2 | −84 dBm | Meet |
| gNB3 | −110 dBm | Not meet |
| gNB4 | −119 dBm | Not meet |

Out of four cells (gNB1-gNB4), two cells (gNB1 & gNB2) meet the criteria for the PSCell change procedure. The other two cells (gNB3 & gNB4) do not meet the criteria for the PSCell change procedure. So, the UE (100) needs to choose between the cells (gNB1 and gNB2) for CPC.

As per the related art, the UE (10) performs measurement for multiple candidate cells configured in conditional reconfiguration received from the network. Further, the UE (10) prioritizes the cell for handover based on the signal condition among the candidate cells that meet the condition configured as given in table 11 and performs the PScell change to that cell as SCG based on the signal condition. In this case, the UE (10) would change the cell (gNB1) which does not include MUSIM assistance information.

TABLE 11

| Cells Detected | Signal Level | CPC criteria? | MUSIM Assistance Configuration? |
|---|---|---|---|
| gNB1 | −80 dBm | Meet | Not Included |
| gNB2 | −84 dBm | Meet | Included |
| gNB3 | −110 dBm | Not meet | Included |
| gNB4 | −119 dBm | Not meet | Not Included |

With a method according to an example embodiment, the UE (100) prioritizes the cell (gNB2) that includes the MUSIM assistance configuration containing "musim-LeaveAssistanceConfig-r17" IE or "musim GapAssistanceConfig-r17" IE in the RRC reconfiguration during the CPC as given in table 12 and adds the cell (gNB2) as SCG.

TABLE 12

| Cells Detected | Signal Level | CPC criteria? | MUSIM Assistance Configuration |
|---|---|---|---|
| gNB2 | −84 dBm | Meet | Included |
| gNB1 | −80 dBm | Meet | Not Included |
| gNB3 | −110 dBm | Not meet | Included |
| gNB4 | −119 dBm | Not meet | Not Included |

Figure 15:
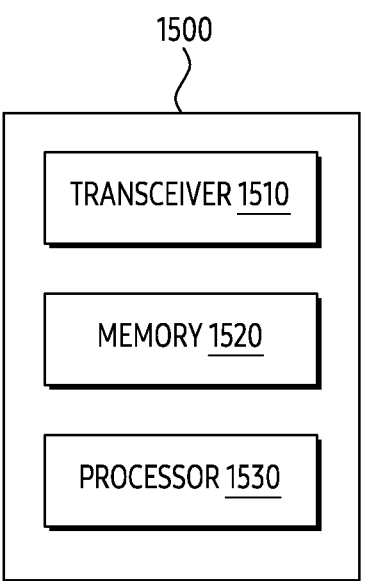
FIG. 15 illustrates a functional configuration of an apparatus acting according to embodiments.

FIG. 15 illustrates a functional configuration of an apparatus acting according to embodiments. The apparatus 1500 may be a base station or a partial element of the base station. For example, the apparatus may be a central unit (CU) of the electronic device. For another example, the apparatus may be a distributed unit (DU) of the electronic device. For yet another example, the apparatus may be a CU-control plane (CU-CP) of the electronic device. For yet another example, the apparatus may be a CU-user plane (CU-UP) of the electronic device.

Referring to FIG. 15, the apparatus 1500 may include at least one transceiver 1510, at least one memory 1520, and at least one processor 1530.

The transceiver 1510 may perform functions for transmitting and receiving signals through a radio channel. For example, the transceiver 1510 may perform a converting function between a baseband signal and a bit string according to a physical layer specification of the system. For example, upon data transmission, the transceiver 1510 generates complex symbols by encoding and modulating a transmit bit string. For example, upon data reception, the transceiver 1510 restores a receive bit string by demodulating and decoding the baseband signal. Further, the transceiver 1510 may up-convert the baseband signal into a radio frequency (RF) band signal to transmit the RF band signal through an antenna, and down-convert the RF band signal received through the antenna into the baseband signal.

To this end, the transceiver 1510 may include a transmission filter, a reception filter, an amplifier, a mixer, an oscillator, a digital to analog converter (DAC), an analog to digital converter (ADC), and the like. For example, the transceiver 1510 may include a plurality of transmission/reception paths. For example, the transceiver 1510 may include at least one antenna array having a plurality of antenna elements. In terms of hardware, the transceiver 1510 may include a digital unit and an analog unit, wherein the analog unit may include a plurality of sub-units according to operating power, operating frequency, and the like.

The transceiver 1510 transmits and receives signals as described above. Accordingly, the transceiver 1510 may be referred to as a 'transmitter unit', a 'receiver unit', or a 'transceiver unit'. Further, throughout the following description, transmission and reception performed via a radio channel, a backhaul network, an optical cable, Ethernet, and other wired paths are used to include the meaning that the above-described processing is performed by the transceiver 1510. According to an embodiment, the transceiver 1510 may provide an interface for communicating with other nodes in the network. In other words, the transceiver 1510 may convert a bit string transmitted from the apparatus 1500 to another node, such as e.g., another access node, another base station, an upper node, a core network, or the like, into a physical signal, and convert a physical signal received from another node into a bit string.

The memory 1520 may store data such as e.g., a basic program, an application program, and setting information for operating the apparatus 1500. The memory 1520 may store various data used by at least one component (e.g., the transceiver 1510 or the processor 1530). The data may include, for example, software and input data or output data for an instruction related thereto. The memory 1520 may include a volatile memory, a non-volatile memory, or a combination of the volatile memory and the non-volatile memory. Further, the memory 1520 may provide data stored therein according to a request of the processor 1530.

The processor 1530 may control the overall operations of the apparatus 1500. For example, the processor 1530 records or reads data in the memory 1520. For example, the processor 1530 transmits and receives a signal through the transceiver 1510. Although FIG. 15 illustrates one processor, embodiments of the disclosure are not limited thereto. The apparatus 1500 may include at least one processor to perform example embodiments. The processor 1530 may be referred to as a control unit or a control means, and may include a processing circuitry. According to embodiments, the processor 1530 may control the apparatus 1500 to perform at least one of operations or methods according to example embodiments.

Although only a single element (e.g., transceiver 1510, memory 1520, processor 1530) is shown in the drawings, it is not excluded that the apparatus 1500 according to embodiments of the present disclosure may include a plurality of elements. For example, the apparatus 1500 may include a plurality of transceivers. The apparatus 1500 may include a plurality of memories. The apparatus 1500 may include a plurality of processors.

According to embodiments, a method for prioritizing cells by a User Equipment (UE) supporting a Multi-Universal Subscriber Identity Module (MUSIM), the method comprises connecting, by the UE, a first SIM of the UE with a primary cell. The method comprises identifying, by the UE, candidate secondary cells for one of a conditional handover, a conditional Primary Secondary (PS) cell addition, or a conditional PS cell change. The method comprises determining, by the UE, whether a Radio Resource Control (RRC) reconfiguration message of the candidate secondary cells comprises at least one of leave assistance information or gap assistance information. The method comprises performing, by the UE, one of prioritizing at least one candidate secondary cell of the candidate secondary cells that supports MUSIM assistance information, in response to determining that the RRC reconfiguration message of the at least one candidate secondary cell comprises at least one of the leave assistance information or the gap assistance information, and prioritizing the candidate secondary cells based on a signal strength of the candidate secondary cells, in response to determining that the RRC reconfiguration message of the at least one candidate secondary cell does not comprise at least one of the leave assistance information or the gap assistance information.

In an embodiment, the connecting, by the UE, the first SIM with the primary cell may include activating, by the UE, a Dedicated Data Service (DDS) in the first SIM; connecting, by the UE, the first SIM with the primary cell; registering, by the UE, on the primary cell; and enabling, by the UE, an idle mode on a second SIM of the UE.

In an embodiment, the identifying, by the UE, of the candidate secondary cells for one of the conditional handover, the conditional PS cell addition, or the conditional PS cell change may include receiving, by the UE, the RRC reconfiguration message including a list of secondary cells from the primary cell; and identifying, by the UE, the candidate secondary cells for one of the conditional handover, the conditional PS cell addition, or the conditional PS cell change from the list of secondary cells.

In an embodiment, the determining, by the UE, of whether the RRC reconfiguration message of the candidate secondary cells includes the leave assistance information and/or the gap assistance information may include performing, by the UE, a measurement of the candidate secondary cells for the conditional handover; detecting, by the UE, that multiple candidate secondary cells are suitable for the conditional handover based on the measurement; and determining, by the UE, whether the RRC reconfiguration message of the multiple candidate secondary cells includes the leave assistance information and/or the gap assistance information for the conditional handover.

In an embodiment, the determining, by the UE, of whether the RRC reconfiguration message of the candidate secondary cells includes the leave assistance information and/or the gap assistance information may include performing, by the UE, a measurement of the candidate secondary cells for the conditional PS cell addition; determining, by the UE, that multiple candidate secondary cells are suitable for the conditional PS cell addition based on the measurement; and determining, by the UE, whether the RRC reconfiguration message of the multiple candidate secondary cells includes the leave assistance information and/or the gap assistance information for the conditional PS cell addition.

In an embodiment, the determining, by the UE, of whether the RRC reconfiguration message of the candidate secondary cells includes the leave assistance information and/or the gap assistance information may include performing, by the UE, a measurement of the candidate secondary cells for the conditional PS cell change; determining, by the UE, that multiple candidate secondary cells are suitable for the conditional PS cell change based on the measurement; and determining, by the UE, whether the RRC reconfiguration message of the multiple candidate secondary cells includes the leave assistance information and/or the gap assistance information for the conditional PS cell change.

In an embodiment, the prioritizing, by the UE, of the one or more candidate secondary cells supporting MUSIM assistance information may include detecting, by the UE, a first candidate secondary cell with MUSIM assistance information support, and a second candidate secondary cell without MUSIM assistance information support based on availability of the leave assistance information and/or the gap assistance information in the RRC reconfiguration message; determining, by the UE, that a signal strength of the second candidate secondary cell is greater than a signal strength of the first candidate secondary cell; determining, by the UE, a second value associated with the signal strength of the second candidate secondary cell based on a lowest signal strength reported in a network; determining, by the UE, a first value associated with the signal strength of the first candidate secondary cell based on the lowest signal strength reported in the network and a weight for the signal strength of the first candidate secondary cell; and prioritizing, by the UE, the first candidate secondary cell and the second candidate secondary cells based on the first value and the second value.

In an embodiment, the prioritizing, by the UE, of the one or more candidate secondary cells supporting MUSIM assistance information may include identifying, by the UE, two or more candidate secondary cells with the MUSIM assistance information support; and prioritizing, by the UE, the two or more candidate secondary cells based on a signal strength, a bandwidth, and a High-Power User Equipment (HPUE) support.

The various example embodiments herein may provide a UE supporting MUSIM for prioritizing the cells. The UE may include a secondary cell prioritizing engine, a memory, and a processor, wherein the secondary cell prioritizing engine is coupled to the memory and the processor. The secondary cell prioritizing engine may be configured for connecting the first SIM of the UE with a primary cell; identifying the candidate secondary cells for conditional handover, or conditional PS cell addition, or conditional PS cell change; determining whether the RRC reconfiguration message of the candidate secondary cells includes the leave assistance information and/or the gap assistance information; prioritizing the one or more candidate secondary cells of the candidate secondary cells supporting the MUSIM assistance information when the RRC reconfiguration message of the one or more candidate secondary cells includes the leave assistance information and/or the gap assistance information; and prioritizing the candidate secondary cells based on the signal strength of the candidate secondary cells, when the RRC reconfiguration message of the one or more candidate secondary cells does not include the leave assistance information and/or the gap assistance information.

According to embodiments, A User Equipment (UE) supporting a Multi-Universal Subscriber Identity Module (MUSIM) for prioritizing cells, the UE comprises a memory. The UE comprises a processor. The UE comprises a secondary cell prioritizing engine, coupled to the memory and the processor. The processor is configured to connect a first SIM of the UE with a primary cell. The processor is configured to identify candidate secondary cells for one of a conditional handover, a conditional Primary Secondary (PS) cell addition, or a conditional PS cell change. The processor is configured to determine whether a Radio Resource Control (RRC) reconfiguration message of the candidate secondary cells comprises at least one of leave assistance information or gap assistance information. The processor is configured to perform one of prioritizing at least one candidate secondary cell of the candidate secondary cells that supports MUSIM assistance information, in response to determining that the RRC reconfiguration message of the at least one candidate secondary cell comprises at least one of the leave assistance information or the gap assistance information, and prioritizing the candidate secondary cells based on a signal strength of the candidate secondary cells, in response to determining that the RRC reconfiguration message of the at least one candidate secondary cell does not comprise at least one of the leave assistance information or the gap assistance information.

In an embodiment, the processor is configured to, for the connecting, by the UE, the first SIM with the primary cell, activate, by the UE, a Dedicated Data Service (DDS) in the first SIM. The processor is configured to, for the connecting, by the UE, the first SIM with the primary cell, connect, by the UE, the first SIM with the primary cell. The processor is configured to, for the connecting, by the UE, the first SIM with the primary cell, register, by the UE, on the primary cell. The processor is configured to, for the connecting, by the UE, the first SIM with the primary cell, enable, by the UE, an idle mode on a second SIM of the UE.

In an embodiment, the processor is configured to for the identifying, by the UE, of the candidate secondary cells for one of the conditional handover, the conditional PS cell addition, or the conditional PS cell change, receive, by the UE, the RRC reconfiguration message including a list of secondary cells from the primary cell. The processor is configured to for the identifying, by the UE, of the candidate secondary cells for one of the conditional handover, the conditional PS cell addition, or the conditional PS cell change, identify, by the UE, the candidate secondary cells for one of the conditional handover, the conditional PS cell addition, or the conditional PS cell change from the list of secondary cells.

In an embodiment, the processor is configured to, for the determining, by the UE, of whether the RRC reconfiguration message of the candidate secondary cells includes the leave assistance information and/or the gap assistance information, perform by the UE, a measurement of the candidate secondary cells for the conditional handover. The processor is configured to, for the determining, by the UE, of whether the RRC reconfiguration message of the candidate secondary cells includes the leave assistance information and/or the gap assistance information, detect, by the UE, that multiple candidate secondary cells are suitable for the conditional handover based on the measurement. The processor is configured to, for the determining, by the UE, of whether the RRC reconfiguration message of the candidate secondary cells includes the leave assistance information and/or the gap assistance information, determine, by the UE, whether the RRC reconfiguration message of the multiple candidate secondary cells includes the leave assistance information and/or the gap assistance information for the conditional handover.

In an embodiment, the processor is configured to, for the determining, by the UE, of whether the RRC reconfiguration message of the candidate secondary cells includes the leave assistance information and/or the gap assistance information, perform, by the UE, a measurement of the candidate secondary cells for the conditional PS cell addition. The processor is configured to, for the determining, by the UE, of whether the RRC reconfiguration message of the candidate secondary cells includes the leave assistance information and/or the gap assistance information, determine, by the UE, that multiple candidate secondary cells are suitable for the conditional PS cell addition based on the measurement. The processor is configured to, for the determining, by the UE, of whether the RRC reconfiguration message of the candidate secondary cells includes the leave assistance information and/or the gap assistance information, determine, by the UE, whether the RRC reconfiguration message of the multiple candidate secondary cells includes the leave assistance information and/or the gap assistance information for the conditional PS cell addition.

In an embodiment, the processor is configured to, for the determining, by the UE, of whether the RRC reconfiguration message of the candidate secondary cells includes the leave assistance information and/or the gap assistance information, perform, by the UE, a measurement of the candidate secondary cells for the conditional PS cell change. The processor is configured to, for the determining, by the UE, of whether the RRC reconfiguration message of the candidate secondary cells includes the leave assistance information and/or the gap assistance information, determine, by the UE, that multiple candidate secondary cells are suitable for the conditional PS cell change based on the measurement. The processor is configured to, for the determining, by the UE, of whether the RRC reconfiguration message of the multiple candidate secondary cells includes the leave assistance information and/or the gap assistance information, determine, by the UE, whether the RRC reconfiguration message of the multiple candidate secondary cells includes the leave assistance information and/or the gap assistance information for the conditional PS cell change.

In an embodiment, the processor is configured to, for the prioritizing, by the UE, of the one or more candidate secondary cells supporting MUSIM assistance information, detect, by the UE, a first candidate secondary cell with MUSIM assistance information support, and a second candidate secondary cell without MUSIM assistance information support based on availability of the leave assistance information and/or the gap assistance information in the RRC reconfiguration message. The processor is configured to, for the prioritizing, by the UE, of the one or more candidate secondary cells supporting MUSIM assistance information, determine, by the UE, that a signal strength of the second candidate secondary cell is greater than a signal strength of the first candidate secondary cell. The processor is configured to, for the prioritizing, by the UE, of the one or more candidate secondary cells supporting MUSIM assistance information, determine, by the UE, a second value associated with the signal strength of the second candidate secondary cell based on a lowest signal strength reported in a network. The processor is configured to, for the prioritizing, by the UE, of the one or more candidate secondary cells supporting MUSIM assistance information, determine, by the UE, a first value associated with the signal strength of the first candidate secondary cell based on the lowest signal strength reported in the network and a weight for the signal strength of the first candidate secondary cell. The processor is configured to, for the prioritizing, by the UE, of the one or more candidate secondary cells supporting MUSIM assistance information, prioritize, by the UE, the first candidate secondary cell and the second candidate secondary cells based on the first value and the second value.

In an embodiment, the processor is configured to, for the prioritizing, by the UE, of the one or more candidate secondary cells supporting MUSIM assistance information, identify, by the UE, two or more candidate secondary cells with the MUSIM assistance information support. The processor is configured to, for the prioritizing, by the UE, of the one or more candidate secondary cells supporting MUSIM assistance information, prioritize, by the UE, the two or more candidate secondary cells based on a signal strength, a bandwidth, and a High-Power User Equipment (HPUE) support.

According to embodiments, a method performed by a User Equipment (UE) supporting a Multi-Universal Subscriber Identity Module (MUSIM), the method comprises connecting a first SIM of the UE with a primary cell. The method comprises receiving a radio resource control (RRC) reconfiguration message of the primary cell including information on candidate cells for a conditional handover, a conditional Primary Secondary (PS) cell addition, or a conditional PS cell change. The method comprises identifying that a RRC reconfiguration message of each of the candidate cells comprises at least one of leave assistance information or gap assistance information. The method comprises performing prioritizing at least one candidate cell of the candidate cells that supports MUSIM assistance information, in response to identifying that the RRC reconfiguration message comprises at least one of the leave assistance information or the gap assistance information.

In an embodiment, the method comprises performing prioritizing the candidate cells based on a signal strength of the candidate cells, in response to identifying that the RRC reconfiguration message does not comprise the leave assistance information and the gap assistance information.

In an embodiment, the connecting the first SIM with the primary cell comprises activating a dedicated data service (DDS) in the first SIM. The connecting the first SIM with the primary cell comprises connecting the first SIM with the primary cell. The connecting the first SIM with the primary cell comprises registering on the primary cell. The connecting the first SIM with the primary cell comprises enabling an idle mode on a second SIM of the UE.

In an embodiment, the method comprises identifying the candidate cells for the conditional handover, the conditional PS cell addition, or the conditional PS cell change based on a list of the candidate cells. The information on the candidate cells comprises the list of candidate cells.

In an embodiment, the identifying that the RRC reconfiguration message comprises at least one of the leave assistance information or the gap assistance information comprises, performing a measurement of the candidate cells for the conditional handover. The identifying that the RRC reconfiguration message comprises at least one of the leave assistance information or the gap assistance information comprises detecting that the candidate cells are suitable for the conditional handover based on the measurement. The identifying that the RRC reconfiguration message comprises at least one of the leave assistance information or the gap assistance information comprises determining whether the RRC reconfiguration message of each of the candidate cells comprises at least one of the leave assistance information or the gap assistance information for the conditional handover.

In an embodiment, the identifying that the RRC recon- figuration message comprises at least one of the leave assistance information or the gap assistance information, comprises performing a measurement of the candidate cells for the conditional PS cell addition. The identifying that the RRC reconfiguration message comprises at least one of the leave assistance information or the gap assistance informa- tion comprises determining that the candidate cells are suitable for the conditional PS cell addition based on the measurement. The identifying that the RRC reconfiguration message comprises at least one of the leave assistance information or the gap assistance information comprises determining whether the RRC reconfiguration message of each of the candidate cells comprises at least one of the leave assistance information or the gap assistance information for the conditional PS cell addition.

In an embodiment, the identifying that the RRC recon- figuration message comprises at least one of the leave assistance information or the gap assistance information, comprises, performing a measurement of the candidate secondary cells for the conditional PS cell change. The identifying that the RRC reconfiguration message comprises at least one of the leave assistance information or the gap assistance information comprises determining that the can- didate cells are suitable for the conditional PS cell change based on the measurement. The identifying that the RRC reconfiguration message comprises at least one of the leave assistance information or the gap assistance information comprises determining whether the RRC reconfiguration message of each of the candidate cells comprises at least one of the leave assistance information or the gap assistance information for the conditional PS cell change.

In an embodiment, the prioritizing the at least one can- didate cell supporting the MUSIM assistance information, comprises detecting a first candidate cell with a MUSIM assistance information support, and a second candidate cell without the MUSIM assistance information support based on availability of at least one of the leave assistance infor- mation or the gap assistance information in the RRC recon- figuration message. The prioritizing the at least one candi- date cell supporting the MUSIM assistance information comprises determining that a signal strength of the second candidate cell is greater than a signal strength of the first candidate cell. The prioritizing the at least one candidate cell supporting the MUSIM assistance information comprises determining a first value associated with the signal strength of the first candidate cell based on a lowest signal strength reported in a network and a weight for the signal strength of the first candidate cell. The prioritizing the at least one candidate cell supporting the MUSIM assistance informa- tion comprises determining a second value associated with the signal strength of the second candidate cell based on the lowest signal strength reported in a network. The prioritizing the at least one candidate cell supporting the MUSIM assistance information comprises prioritizing the first can- didate cell and the second candidate cells based on the first value and the second value.

In an embodiment, the prioritizing of the at least one candidate cell supporting the MUSIM assistance informa- tion comprises identifying two or more candidate cells with a MUSIM assistance information support. The prioritizing of the at least one candidate cell supporting the MUSIM assistance information comprises prioritizing the two or more candidate cells based on a signal strength, a band- width, and a High-Power User Equipment (HPUE) support of the two or more candidate cells.

According to embodiments, a User Equipment (UE) sup- porting a Multi-Universal Subscriber Identity Module (MUSIM), the UE comprises a processor. The UE comprises a transceiver. The processor is configured to connect a first SIM of the UE with a primary cell. The processor is configured to receive a radio resource control (RRC) recon- figuration message of the primary cell including information on candidate cells for a conditional handover, a conditional Primary Secondary (PS) cell addition, or a conditional PS cell change. The processor is configured to identify that a RRC reconfiguration message of each of the candidate cells comprises at least one of leave assistance information or gap assistance information. The processor is configured to per- form prioritizing at least one candidate cell of the candidate cells that supports MUSIM assistance information, in response to identifying that the RRC reconfiguration mes- sage of the at least one candidate cell comprises at least one of the leave assistance information or the gap assistance information.

In an embodiment, the processor is configured to perform prioritizing the candidate cells based on a signal strength of the candidate cells, in response to identifying that the RRC reconfiguration message of the at least one candidate cell does not comprise the leave assistance information and the gap assistance information.

In an embodiment, the processor is configured to activate a Dedicated Data Service (DDS) in the first SIM. The processor is configured to connect the first SIM with the primary cell. The processor is configured to register on the primary cell. The processor is configured to enable an idle mode on a second SIM of the UE.

In an embodiment, the processor is configured to identify the candidate cells for the conditional handover, the condi- tional PS cell addition, or the conditional PS cell change based on a list of candidate cells. The information on the candidate cells comprises the list of candidate cells.

In an embodiment, the processor is configured to perform a measurement of the candidate cells for the conditional handover. The processor is configured to detect that the candidate cells are suitable for the conditional handover based on the measurement. The processor is configured to determine whether the RRC reconfiguration message of each of the candidate cells comprises at least one of the leave assistance information or the gap assistance information for the conditional handover.

In an embodiment, the processor is configured to perform a measurement of the candidate cells for the conditional PS cell addition. The processor is configured to determine that the candidate cells are suitable for the conditional PS cell addition based on the measurement. The processor is con- figured to determine whether the RRC reconfiguration mes- sage of each of the candidate cells comprises at least one of the leave assistance information or the gap assistance infor- mation for the conditional PS cell addition.

In an embodiment, the processor is configured to perform a measurement of the candidate cells for the conditional PS cell change. The processor is configured to determine that the candidate cells are suitable for the conditional PS cell change based on the measurement. The processor is config- ured to determine whether the RRC reconfiguration message of each of the candidate cells comprises at least one of the leave assistance information or the gap assistance informa- tion for the conditional PS cell change.

In an embodiment, the processor is configured to detect a first candidate cell with a MUSIM assistance information support, and a second candidate cell without the MUSIM assistance information support based on availability of at least one of the leave assistance information or the gap assistance information in the RRC reconfiguration message. The processor is configured to determine that a signal strength of the second candidate cell is greater than a signal strength of the first candidate cell. The processor is configured to determine a first value associated with the signal strength of the first candidate cell based on a lowest signal strength reported in a network and a weight for the signal strength of the first candidate cell. The processor is configured to determine a second value associated with the signal strength of the second candidate cell based on the lowest signal strength reported in a network. The processor is configured to prioritize the first candidate cell and the second candidate cells based on the first value and the second value.

In an embodiment, the processor is configured to identify two or more candidate cells with a MUSIM assistance information support. The processor is configured to prioritize the two or more candidate cells based on a signal strength, a bandwidth, and a High-Power User Equipment (HPUE) support of the two or more candidate cells.

According to embodiments, a non-transitory computer-readable storage medium having stored thereon program instructions, the instructions, when executed by a processor of a User Equipment (UE) supporting a Multi-Universal Subscriber Identity Module (MUSIM), perform operations including connecting a first SIM of the UE with a primary cell. The instructions, when executed by the processor, perform operations including receiving a radio resource control (RRC) reconfiguration message of the primary cell including information on candidate cells for a conditional handover, a conditional Primary Secondary (PS) cell addition, or a conditional PS cell change. The instructions, when executed by the processor, perform operations including identifying that a RRC reconfiguration message of each of the candidate cells comprises at least one of leave assistance information or gap assistance information. The instructions, when executed by the processor, performing operations including perform prioritizing at least one candidate cell of the candidate cells that supports MUSIM assistance information, in response to identifying that the RRC reconfiguration message comprises at least one of the leave assistance information or the gap assistance information.

In an embodiment, the instructions, when executed by the processor, perform operations including performing prioritizing the candidate cells based on a signal strength of the candidate cells, in response to identifying that the RRC reconfiguration message does not comprise the leave assistance information and the gap assistance information.

The example embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by a user equipment (UE) supporting a multi-universal subscriber identity module (MUSIM), the method comprising:

connecting a first SIM of the UE with a primary cell;

receiving a radio resource control (RRC) reconfiguration message of the primary cell including information on candidate cells for a conditional handover, a conditional Primary Secondary (PS) cell addition, or a conditional PS cell change;

identifying that the RRC reconfiguration message comprises at least one of leave assistance information or gap assistance information for at least one cell among the candidate cells; and prioritizing the at least one cell among the candidate cells that supports MUSIM assistance information, in response to identifying that the RRC reconfiguration message comprises at least one of the leave assistance information or the gap assistance information.

2. The method of claim 1, further comprising;

prioritizing the candidate cells based on a signal strength of the candidate cells, in response to identifying that the RRC reconfiguration message does not comprise the leave assistance information and the gap assistance information for the candidate cells.

3. The method of claim 1, wherein the connecting the first SIM with the primary cell comprises:

activating a dedicated data service (DDS) in the first SIM;

connecting the first SIM with the primary cell;

registering on the primary cell; and enabling an idle mode on a second SIM of the UE.

4. The method of claim 1, further comprising:

identifying the candidate cells for the conditional handover, the conditional PS cell addition, or the conditional PS cell change based on a list of the candidate cells, wherein the information on the candidate cells comprises the list of the candidate cells.

5. The method of claim 1, wherein the identifying that the RRC reconfiguration message comprises at least one of the leave assistance information or the gap assistance information; comprises:

performing a measurement of the candidate cells for the conditional handover;

detecting that the candidate cells are suitable for the conditional handover based on the measurement; and determining whether the RRC reconfiguration message comprises at least one of the leave assistance information or the gap assistance information for each of the candidate cells.

6. The method of claim 1, wherein the identifying that the RRC reconfiguration message comprises at least one of the leave assistance information or the gap assistance information comprises:

performing a measurement of the candidate cells for the conditional PS cell addition;

determining that the candidate cells are suitable for the conditional PS cell addition based on the measurement; and determining whether the RRC reconfiguration message comprises at least one of the leave assistance information or the gap assistance information for each of the candidate cells.

7. The method of claim 1, wherein the identifying that the RRC reconfiguration message comprises at least one of the leave assistance information or the gap assistance information comprises:

performing a measurement of the candidate cells for the conditional PS cell change;

determining that the candidate cells are suitable for the conditional PS cell change based on the measurement; and determining whether the RRC reconfiguration message comprises at least one of the leave assistance information or the gap assistance information for each of the candidate cells.

8. The method of claim 1, wherein the prioritizing the at least one cell supporting the MUSIM assistance information comprises:

detecting a first candidate cell with a MUSIM assistance information support, and a second candidate cell without the MUSIM assistance information support based on availability of at least one of the leave assistance information or the gap assistance information in the RRC reconfiguration message;

determining that a signal strength of the second candidate cell is greater than a signal strength of the first candidate cell;

determining a first value associated with the signal strength of the first candidate cell based on a lowest signal strength reported in a network and a weight for the signal strength of the first candidate cell;

determining a second value associated with the signal strength of the second candidate cell based on the lowest signal strength reported in a network; and prioritizing the first candidate cell and the second candidate cell based on the first value and the second value.

9. The method of claim 1, wherein the prioritizing of the at least one cell supporting the MUSIM assistance information comprises:

identifying two or more candidate cells with a MUSIM assistance information support; and prioritizing the two or more candidate cells based on a signal strength, a bandwidth, and a high-power user equipment (HPUE) support of the two or more candidate cells.

10. A user equipment (UE) supporting a multi-universal subscriber identity module (MUSIM), the UE comprising:

a processor including processing circuitry; and a transceiver;

wherein the processor is configured to:

connect a first SIM of the UE-with a primary cell;

receive a radio resource control (RRC) reconfiguration message of the primary cell including information on candidate cells for a conditional handover, a conditional Primary Secondary (PS) cell addition, or a conditional PS cell change;

identify that the RRC reconfiguration message comprises at least one of leave assistance information or gap assistance information for at least one cell among the candidate cells; and prioritize the at least one cell among the candidate cells that supports MUSIM assistance information, in response to identifying that the RRC reconfiguration message comprises at least one of the leave assistance information or the gap assistance information.

11. The UE of claim 10, wherein the processor is configured to:

prioritize the candidate cells based on a signal strength of the candidate cells, in response to identifying that the RRC reconfiguration message does not comprise the leave assistance information and the gap assistance information for the candidate cells.

12. The UE of claim 10, wherein the processor is configured to:

activate a Dedicated Data Service (DDS) in the first SIM;

connect the first SIM with the primary cell;

register on the primary cell; and enable an idle mode on a second SIM of the UE.

13. The UE of claim 10, wherein the processor is configured to:

identify the candidate cells for the conditional handover, the conditional PS cell addition, or the conditional PS cell change based on a list of candidate cells, wherein the information on the candidate cells comprises the list of candidate cells.

14. The UE of claim 10, wherein the processor is configured to:

perform a measurement of the candidate cells for the conditional handover;

detect that the candidate cells are suitable for the conditional handover based on the measurement; and determine whether the RRC reconfiguration message comprises at least one of the leave assistance information or the gap assistance information for each of the candidate cells.

15. The UE of claim 10, wherein the processor is configured to:

perform a measurement of the candidate cells for the conditional PS cell addition;

determine that the candidate cells are suitable for the conditional PS cell addition based on the measurement; and determine whether the RRC reconfiguration message comprises at least one of the leave assistance information or the gap assistance information for each of the candidate cells.

16. The UE of claim 10, wherein the processor is configured to:

perform a measurement of the candidate cells for the conditional PS cell change;

determine that the candidate cells are suitable for the conditional PS cell change based on the measurement; and determine whether the RRC reconfiguration message comprises at least one of the leave assistance information or the gap assistance information for each of the candidate cells.

17. The UE of claim 10, wherein the processor is configured to:

detect a first candidate cell with a MUSIM assistance information support, and a second candidate cell without the MUSIM assistance information support based on availability of at least one of the leave assistance information or the gap assistance information in the RRC reconfiguration message;

determine that a signal strength of the second candidate cell is greater than a signal strength of the first candidate cell;

determine a first value associated with the signal strength of the first candidate cell based on a lowest signal strength reported in a network and a weight for the signal strength of the first candidate cell;

determine a second value associated with the signal strength of the second candidate cell based on the lowest signal strength reported in a network; and prioritize the first candidate cell and the second candidate cell based on the first value and the second value.

18. The UE of claim 10, wherein the processor is configured to:

identify two or more candidate cells with a MUSIM assistance information support; and prioritize the two or more candidate cells based on a signal strength, a bandwidth, and a high-power user equipment (HPUE) support of the two or more candidate cells.

19. A non-transitory computer-readable storage medium having stored thereon program instructions, the instructions, when executed by a processor of a user equipment (UE) supporting a multi-universal subscriber identity module (MUSIM), cause the UE to perform operations including:

connecting a first SIM of the UE with a primary cell;

receiving a radio resource control (RRC) reconfiguration message of the primary cell including information on candidate cells for a conditional handover, a conditional Primary Secondary (PS) cell addition, or a conditional PS cell change;

identifying that the RRC reconfiguration message comprises at least one of leave assistance information or gap assistance information for at least one cell among the candidate cells; and prioritizing the at least one cell among the candidate cells that supports MUSIM assistance information, in response to identifying that the RRC reconfiguration message comprises at least one of the leave assistance information or the gap assistance information.

20. The non-transitory computer-readable storage medium of claim 19, wherein the instructions, when executed by a processor, cause the UE to perform operations including:

prioritizing the candidate cells based on a signal strength of the candidate cells, in response to identifying that the RRC reconfiguration message does not comprise the leave assistance information and the gap assistance information for the candidate cells.

* * * * *